(12) United States Patent
Moeck

(10) Patent No.: US 8,196,216 B2
(45) Date of Patent: Jun. 5, 2012

(54) SYSTEMS FOR ASSESSING AND ENHANCING THE PERFORMANCE OF SCANNING PROBE MICROSCOPES BY QUANTIFYING AND ENFORCING SYMMETRIES AND PERIODICITIES IN TWO DIMENSIONS

(75) Inventor: Peter Moeck, Portland, OR (US)

(73) Assignee: State of Oregon acting by and through the State Board of Higher Education on behalf of Portland State University, Portland, OR (US)

( * ) Notice: Subject to any disclaimer, the term of this patent is extended or adjusted under 35 U.S.C. 154(b) by 118 days.

(21) Appl. No.: 12/660,422

(22) Filed: Feb. 25, 2010

(65) Prior Publication Data

US 2010/0223697 A1    Sep. 2, 2010

Related U.S. Application Data

(60) Provisional application No. 61/228,463, filed on Jul. 24, 2009, provisional application No. 61/208,782, filed on Feb. 27, 2009.

(51) Int. Cl.
*G01Q 40/00* (2010.01)
(52) U.S. Cl. ............................................ 850/19; 850/20
(58) Field of Classification Search .................... 850/19, 850/20
See application file for complete search history.

(56) References Cited

U.S. PATENT DOCUMENTS

2006/0032433 A1*   2/2006   Sakata ........................... 117/89

* cited by examiner

*Primary Examiner* — Kiet T Nguyen
(74) *Attorney, Agent, or Firm* — Klarquist Sparkman, LLP

(57) ABSTRACT

Scanning probe microscope (SPM) images are enhanced by enforcing one or more symmetries that can be selected based on suitable Fourier coefficient amplitude or phase angle residuals, and/or geometric Akaike information criteria, and/or cross correlation techniques. Alternatively, this selection can be based on prior knowledge of specimen characteristics. In addition, a scanning microscope point spread function is obtained based on the evaluation of a calibration image by enforcing at least one symmetry and can be applied to other image acquisitions.

15 Claims, 18 Drawing Sheets
(12 of 18 Drawing Sheet(s) Filed in Color)

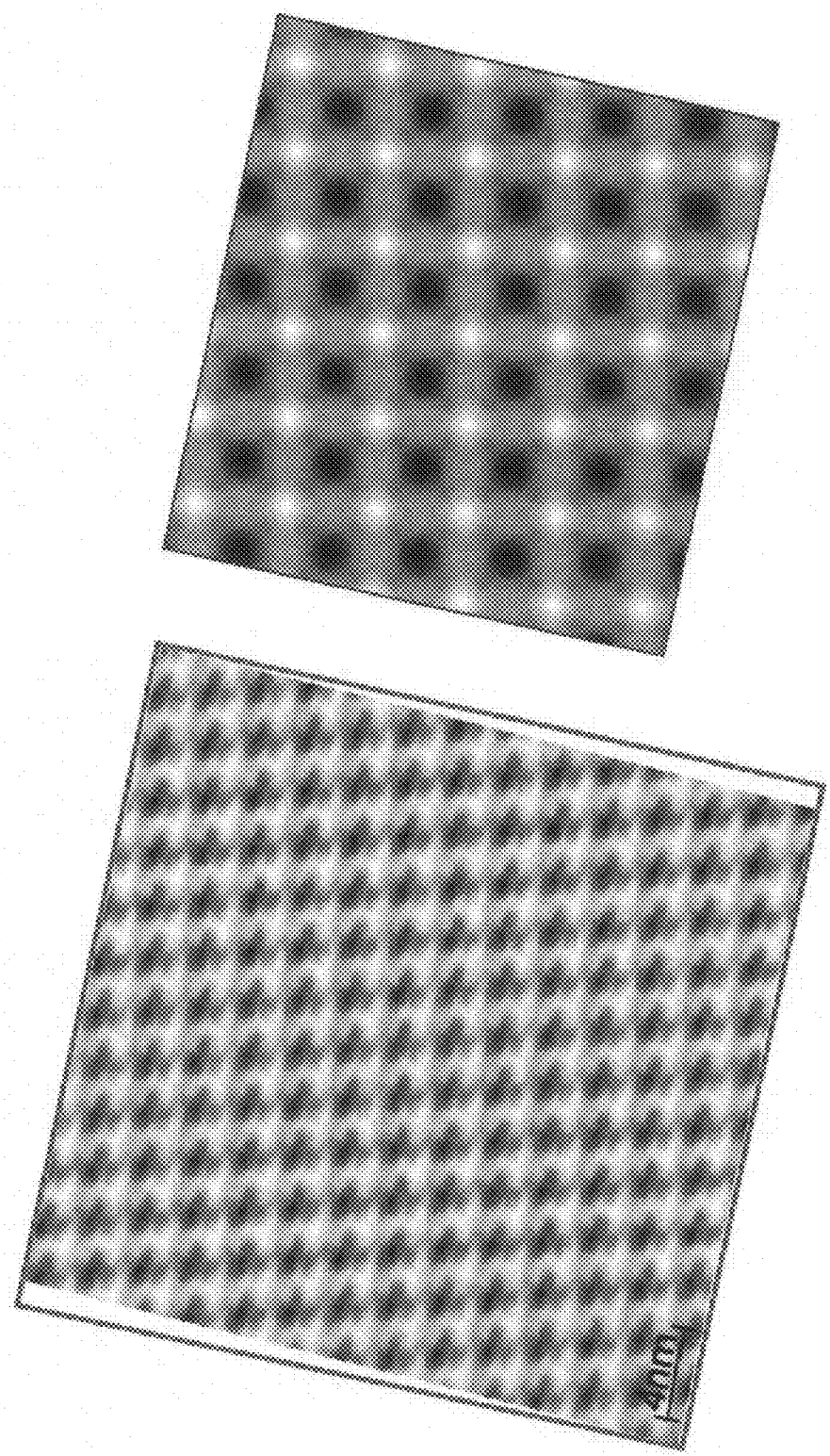

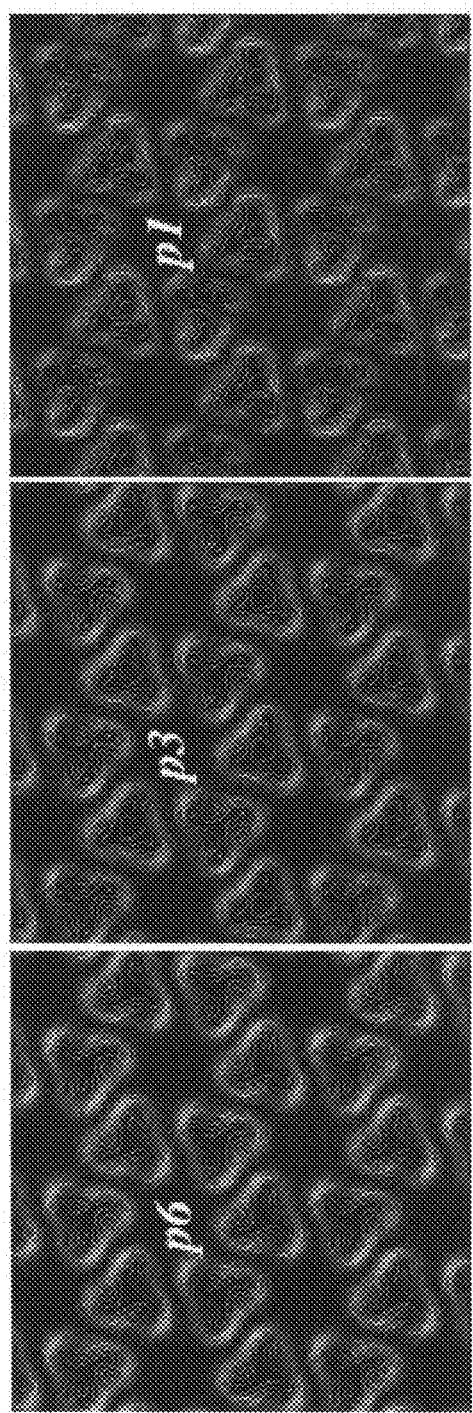

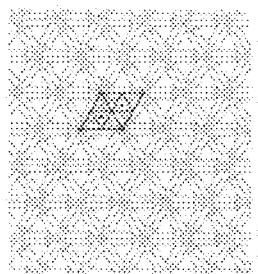 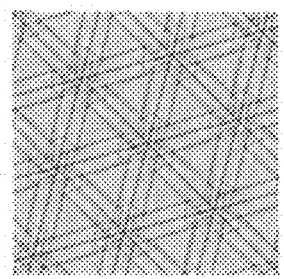 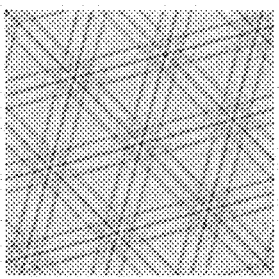 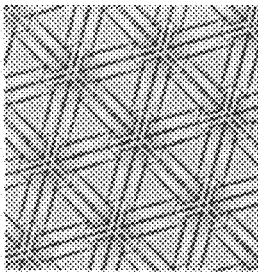
FIG. 19A      FIG. 19B      FIG. 19C      FIG. 19D
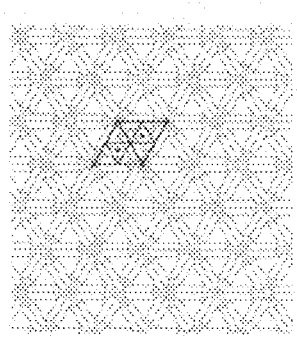 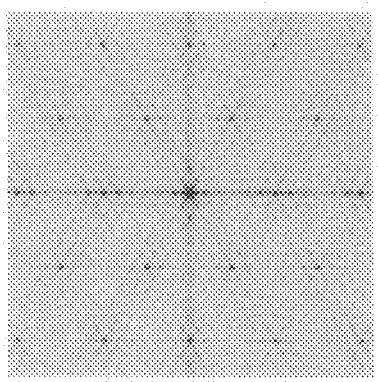
FIG. 20A      FIG. 20B

SYSTEMS FOR ASSESSING AND ENHANCING THE PERFORMANCE OF SCANNING PROBE MICROSCOPES BY QUANTIFYING AND ENFORCING SYMMETRIES AND PERIODICITIES IN TWO DIMENSIONS

CROSS-REFERENCE TO RELATED APPLICATIONS

This application claims the benefit of U.S. Provisional Patent Applications 61/208,782, filed Feb. 27, 2009 and 61/228,463, filed Jul. 24, 2009, and is related to U.S. Pat. No. 7,472,576, issued Jan. 6, 2009, all of which are incorporated herein by reference.

BACKGROUND

Scanning probe microscopy (SPM) is a relatively new form of microscopy that is used to image surfaces and small objects that are supported by surfaces. Scanning probe microscopes (SPMs) use a very small probe, frequently a sharp tip that may be attached to a cantilever, to gather information about surfaces and small objects. This probe is scanned laterally, very close to the surface or objects, while interactions between the probe and surface or objects are measured. The "images" formed by SPMs are plots of the measured value of these interactions as a function of position along the surface or object. In a generalized sense, scanning electron microscopes (SEMs) and scanning transmission electron microscopes (STEMs) can also be considered as being part of the SPM type family of microscopes where the scanning probe is a fine beam of electrons.

SPMs are categorized by the type(s) of interaction that they measure and plot. The two most common types of SPMs are the scanning tunneling microscope (STM) and the atomic force microscope (AFM). STMs measure tunneling currents between the probe and surface. AFMs, in contrast, measure quantum-physical forces between the probe and surface or object. Exemplary forms of scanning probe microscopy are listed in the following table:

| Acronym | Name |
|---|---|
| AFM | atomic force microscopy |
| EFM | electrostatic force microscope |
| ESTM | electrochemical scanning tunneling microscope |
| FMM | force modulation microscopy |
| KPFM | Kelvin probe force microscopy |
| MFM | magnetic force microscopy |
| MRFM | magnetic resonance force microscopy |
| NSOM | near-field scanning optical microscopy |
| PFM | piezo force microscopy |
| PSTM | photon scanning tunneling microscopy |
| PTMS | photothermal microspectroscopy/microscopy |
| SECM | scanning electrochemical microscopy |
| SCM | scanning capacitance microscopy |
| SGM | scanning gate microscopy |
| SICM | scanning ion-conductance microscopy |
| SNOM | scanning near-field optical microscopy (same as NSOM) |
| SPSM | spin polarized scanning tunneling microscopy |
| SThM | scanning thermal microscopy |
| STM | scanning tunneling microscopy |
| SPSTM | spin-polarized scanning tunneling microscopy |
| SVM | scanning voltage microscopy |
| SHPM | scanning Hall probe microscopy |
| CDSPM | critical dimension scanning probe microscope |
| SEM | scanning electron microscope |
| STEM | scanning transmission electron microscope |

Certain types of SPMs can be used to image surfaces or objects at atomic resolution. In principle, SPMs can resolve individual atoms, groups of atoms, molecules, and arrays of molecules (at a fraction of the nanometer length scale). However, the accuracy of the performance of SPMs is limited by the accuracy of the two-dimensional (2D) scanning mechanism (i.e., the accuracy with which two-dimensional positions along the surface can be controlled and measured), among other limitations such as the finite size of the SPM probe tip. Thus, there is a need for improved systems for assessing the performance, calibrating, and enhancing SPMs.

SUMMARY

The present disclosure pertains to systems, apparatus, methods, kits, and software for assessing and enhancing the performance and/or calibrating scanning probe microscopes.

Methods of improving the performance of an SPM microscope and/or images that are recorded with it comprise collecting an SPM image of a calibration sample having a known 2D or 1D periodicity and high 2D or 1D symmetry using the SPM. The SPM image is processed to determine the prevalent point spread function of the whole microscopical imaging process (and its inverse function) and its/(their) Fourier transform(s), as well as the characteristic point spread functions that represent certain physical disturbances of the imaging process and their Fourier transforms in addition to the most likely symmetry and periodicity of the calibration sample.

The selected point spread function or its inverse function in either Fourier space or direct space is applied to one or more images recorded from other samples with the same microscope under essentially the same or similar experimental conditions and with the same or a similar scanning probe tip. In some examples, the other samples for which the SPM images are to be improved possess the same periodicity whereby the Fourier transform of these SPM images is divided by the selected point spread function in Fourier space and the result of this operation is Fourier back-transformed into direct space. In other examples, the other samples for which the SPM images are to be improved possess either no periodicity or a different periodicity than the calibration sample, whereby the Fourier transform of the selected inverse point spread function is first Fourier back-transformed into direct space, where it is then convolved with the SPM images.

In other examples, methods comprise collecting an SPM image of a calibration sample having a known symmetry and periodicity, and processing the SPM image to determine the most likely symmetry and periodicity of the calibration sample. The SPM microscope is configured to manually and/or automatically repeat the steps of collecting and processing until a most likely symmetry and periodicity is selected. In some examples, a correspondence between the most likely symmetry and periodicity and a known symmetry and periodicity is assessed by computing a combined figure of merit. In other embodiments, the correspondence between the most likely symmetry and periodicity and the known symmetry and periodicity is assessed by computing a figure of merit that involves residuals that are computed from Fourier coefficient amplitudes and phases. In some examples, the calibration sample is a first calibration sample, and the method further comprises repeating the steps of collecting, processing, and adjusting using a second calibration sample having a known symmetry and periodicity different than the known symmetry and periodicity of the first calibration sample to further refine the microscope performance. In some examples, a calibration sample is selected based on an anticipated periodicity and/or symmetry in an unknown sample to be imaged by the SPM. In additional representative examples, an SPM image of a periodic sample is collected and processed to determine a most likely sample symmetry and periodicity. An enhanced or corrected image or otherwise processed image is obtained by enforcing the most likely symmetry and periodicity on the SPM image. The most likely symmetry and periodicity can be enforced based on an image intensity distribution and can be selected as one (or more) of the 17 plane symmetry groups, the 17 plane gray symmetry groups, the 46 plane black-white symmetry groups, the 15 diperiodic multicolor 3D space symmetry groups, or the 80 diperiodic 3D space symmetry groups. Alternatively, for 1D periodic samples, the respective 1D symmetric subgroups of one or more of these symmetry groups can be enforced.

In some examples, images are processed based on a comparison of Fourier amplitudes and phase angles computed from the image with Fourier amplitudes and phase angles of samples of known symmetry and periodicity. In some examples, images are processed so as to reduce residuals of the Fourier coefficient amplitudes and phase angles.

In some examples, the prevailing point spread function of the scanning probe microscope is estimated in situ and used to correct scans and images of progressively larger sample areas subsequently until no further improvement can be obtained by this "boot-strapping approach", i.e. by the enlarging of the scanned sample area.

Kits for assessing performance and/or calibrating the SPM microscopes comprise one or more calibration samples configured to be imaged and having a known symmetry and periodicity. One or more computer readable media are provided that contain computer-executable instructions for processing an SPM image of the one or more calibration samples to determine a most likely symmetry and periodicity. In some examples, the one or more calibration samples comprise a substrate, a periodic material deposited on the substrate to form an imageable surface, and an indicium providing information on the identity and/or symmetry and periodicity of the sample.

In other examples, kits for assessing the performance and/or calibrating an SPM microscope comprise a set of calibration samples having known symmetries and periodicities, the symmetry and periodicity of each calibration sample being different than the symmetry and periodicity of each other calibration sample, wherein each calibration sample comprises a substrate, a periodic material deposited on the substrate to form a surface imageable by the SPM microscope, and an indicium providing information on the identity and/or symmetry and periodicity of the sample. One or more computer readable media that contain computer-executable instructions for processing an SPM image of the one or more calibration samples to determine a most likely symmetry and periodicity are provided. In some examples, the substrates are silicon, mica, $BaF_2$, silver, gold, $MoS_2$, $WSe_2$, or graphite.

In other examples, the periodic material deposited on the at least one substrate is a regular array of fluorinated cobalt phthalocyanine ($F_{16}CoPc$) molecules or hexaazatriphenylene-hexacarbonitrile (HATCN) molecules or small beads of mono-disperse polystyrene latex particles. In other examples, the periodic material deposited on at least one substrate is a regular array of transition-metal phthalocyanine molecules or halogenated transition-metal phthalocyanine molecules. In other examples, calibration samples comprise densest packed arrays of monodisperse polystyrene latex spheres that are held together by either meniscus or van der Waals forces on a substrate.

In typical examples, the one or more computer readable media include computer-executable instructions for enforcing the most likely symmetry on at least one image.

In some examples, the kit and scanning probe microscope are configured to estimate the prevailing point spread function of the scanning probe microscope in situ and to use it to correct scans and images of progressively larger sample areas subsequently until no further improvement can be obtained by such an automated "boot-strapping approach", i.e. by progressively enlarging the scanned sample area.

These and other features and aspects of the disclosed technology are set forth below with reference to the accompanying drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 3A is an original STM image of a regular array of $F_{16}CoPc$ molecules, such as that shown schematically in FIG. 2, and FIG. 3B is an enhanced or corrected version of the image in which p4*mm* symmetry has been enforced.

FIG. 4A shows raw data. FIGS. 4B-4F show p1 enforced (i.e. translation averaged), p2 enforced, p3 enforced, p6 enforced, and p6*mm* enforced versions of the data, respectively. Each of the symmetrized images contains about 5.5 unit cells in order to approximately match the magnification of the raw data.

FIGS. 6A-6C contain contour plots of the symmetrized data of FIGS. 4E, 4D and 4B, respectively. Three unit cells are displayed in each plot. Each of the unit cells contains two HATCN molecules. Note that the distribution of contour lines in the translation averaged version of the raw data (FIG. 6C) possess a "mildly broken" three-fold point at position (0,0). Enforcing this three-fold point results in plane group p3 (FIG. 6B) with the byproduct that positions (⅓,⅔) and (⅔,⅓) both acquire site symmetry 3. Entities with point symmetry 3 need to be placed there, but there is no restriction that these entities need be identical. Enforcing a "more heavily broken" two-fold point in the translation averaged version of the raw data at (½,½) leads to these two positions becoming symmetry equivalent, i.e., requires the occupation by identical entities (while retaining site symmetry 3). Also the additional enforcing of this two-fold point leads to the "upgrade" to a six-fold point at position (0,0) and one arrives at an arrangement of the contours of two identical HATCN molecules (with their point symmetry reduced to point group 3) in plane group p6, FIG. 6A.

FIG. 7A is raw data, 1771 by 1771 pixels, constant tunneling current mode, tip bias 1 V (with respect to the more negative sample), 0.1 nA tunneling current. FIGS. 7B-7E are symmetry enforced versions of this array. Enforcing plane group p2 as shown in FIG. 7B leads to an oblique lattice. Enforcing orthogonality of the 2D lattice vectors results in either a rectangular lattice (FIG. 7C) or a square lattice (FIG. 7D and FIG. 7E). The whole plane symmetry enforcing procedure can be thought of as aligning the periodic motifs of all independent STM images from the multiple mini-tips on top of each other, thus, enhancing the signal to noise ratio significantly when done correctly as in FIG. 7E. From FIG. 7A, a blunt tip size of approximately 2 nm can be inferred.

FIG. 8A is a model of an isolated molecule of fluorinated cobalt phthalocyanine ($F_{16}CoPc$).

FIGS. 8B-8C are two possible 2D periodic arrangements of the molecule of FIG. 8A in plane group p4$mm$ under the assumption that the molecule remains geometrically undistorted. While FIG. 8B shows a 2D periodic arrangements of this molecule with a "single molecule" motif, FIG. 8C requires a "paired-up molecules" motif. The 2D point symmetry group of all molecules in this figure is 4$mm$. All other (homologous) phthalocyanines (where the central Co atom may be replaced by a transition-metal atom of valence two, all of the F atoms may be replaced by other halogens or hydrogen atoms) possess the same point symmetry (when isolated). The 2D lattice in both possible 2D periodic arrangements of the two different motifs is a square. Seven molecules encompassing an area of seven (primitive) unit cells are shown in FIG. 8B, while 8 molecules encompassing an area of only 4 (centered) unit cells are shown in FIG. 8C.

FIG. 10A is raw data with 512 by 512 pixels, constant current mode, 1 V tip bias (with respect to the more negative sample), at 0.15 nA. FIG. 10B is an intensity distribution image of a p3$m$1 enforced version of the raw data with 4 unit cells superimposed by dark dashed lines, 53 reflections of which 13 are unique, were used for the Fourier synthesis that produced this image. Six reflections were not observed, i.e. had zero $A_o$, but were created by the symmetry enforcing procedure. The inset in FIGS. 10A-10B shows approximately two unit cells as a contour map with the unit cell translation vectors highlighted by dashed bright arrows. These unit cells are rotated 60° clockwise with respect to their standard representation in the International Tables for Crystallography so that the 2D lattice vectors [1,0] run from right to left instead from top to bottom.

FIG. 11A shows an intensity distribution and FIG. 11B is a contour map of approximately five unit cells with outline of one unit cell.

FIG. 12A is a contour map and FIG. 12B is a density map. A unit cell is sketched into the density map.

FIG. 13A is raw data with 512 by 512 pixels with a translation averaged contour map as an inset (representing 1.5 unit cells). FIG. 13B is a corrected STM image (512 by 512 pixels) with translation averaged contour map as inset (also representing 1.5 unit cells).

FIG. 15A is raw data, FIG. 15B is p4 enforced data, and FIG. 15C is a contour map of the p4 enforced data. A sketch of the structure of this molecule is shown in FIG. 15D.

FIGS. 16A-16C are scanning electron microscopy (SEM) images of highly ordered Ga nano-droplets on a GaAs surface produced by a focused ion beam. While FIG. 16A shows the raw data and gives the Fourier coefficient amplitude and phase angle residuals of this data from an ideal hexagonal array of densest packed circular entities (i.e. plane group p6$mm$), FIG. 16B shows the p6$mm$ symmetrized version of the data. From the symmetrized data, the average shape and size of the nano-droplets and their average separation can be straightforwardly determined. FIG. 16C is an inverse contour plot of FIG. 16B that reveals the average shape of the nano-droplets particularly well.

FIGS. 17A to 19D illustrate the use of a cross-correlation technique for the determination of a most likely plane symmetry group that an image possesses. FIG. 17A shows an original image.

FIGS. 19A-19D show an original image (FIG. 19A) and cross-correlations with versions of this image that have been symmetrized with plane groups that contain three-fold rotation points at the crystallographic origin (FIGS. 19B-19D). FIG. 19B is a cross-correlation of the image of FIG. 19A with a p3 symmetrized version of this image. Likewise FIGS. 19C-19D are cross-correlations of the image of FIG. 19A with p3$m$1 (FIG. 19C) and p31$m$ (FIG. 19D) symmetrized versions of this image.

FIGS. 20A-20B illustrate the detection of the unit cell in direct space by an auto-correlation of an image. FIG. 20A shows the original image and FIG. 20B shows the auto-correlated version of this image.

DETAILED DESCRIPTION

Figure 1:
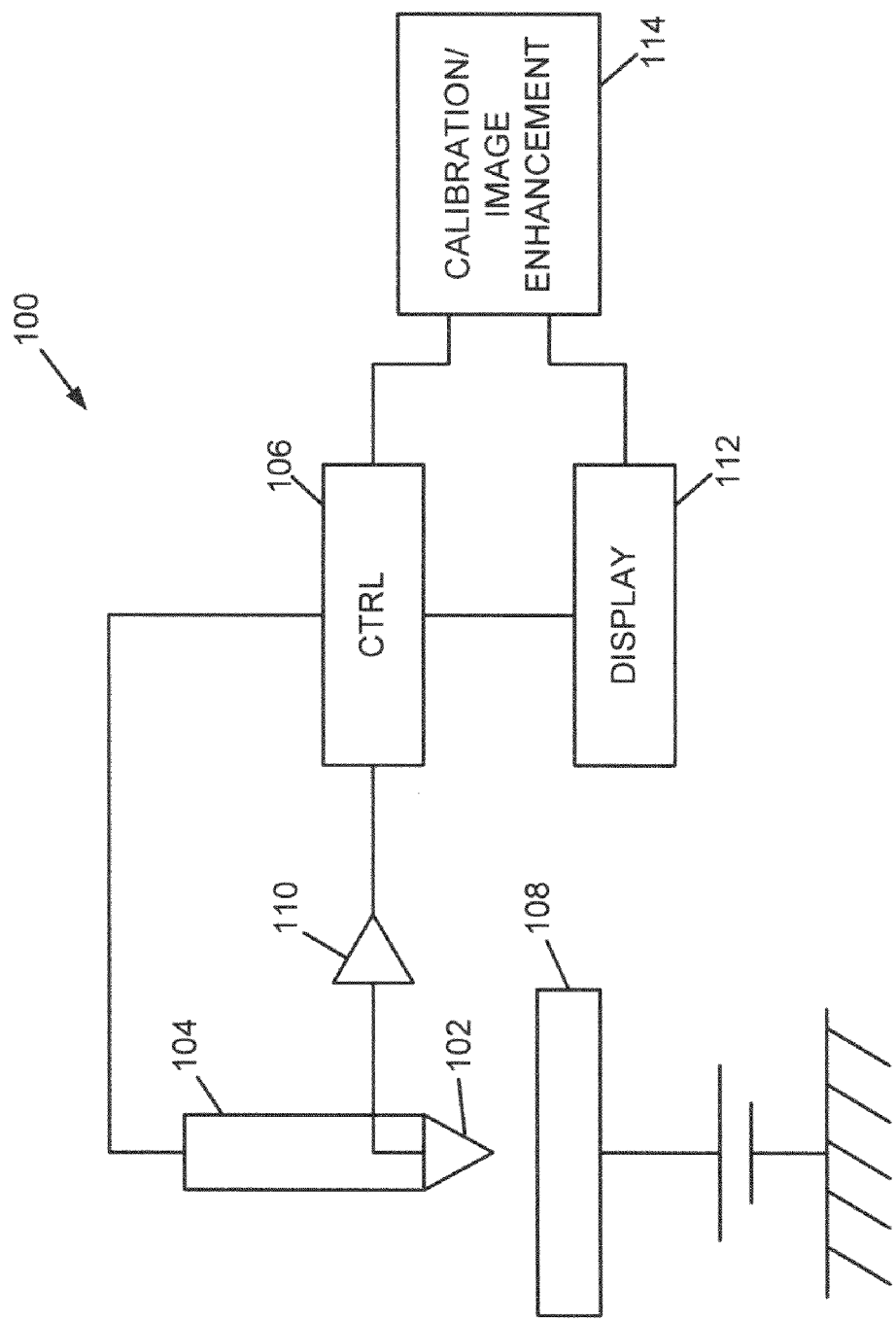
FIG. 1 is a schematic view of a representative scanning tunneling microscope.

As used in this application and in the claims, the singular forms "a," "an," and "the" include the plural forms unless the context clearly dictates otherwise. Additionally, the term "includes" means "comprises."

The described systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved.

The described methods, systems, and apparatus can be employed for 2D as well as for 1D periodic and symmetric SPM images and samples. The description, therefore, concentrates on 2D periodic and symmetric SPM images and samples for convenient illustration, but similar considerations apply to 1D periodic and symmetric images.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

Theories of operation, scientific principles, or other theoretical descriptions presented herein in reference to the apparatus or methods of this disclosure have been provided for the purposes of better understanding and are not intended to be limiting in scope. The apparatus and methods in the appended claims are not limited to those apparatus and methods which function in the manner described by such theories of operation.

I. INTRODUCTION

The present disclosure provides systems, including apparatus, methods, kits, and computer readable media that include instructions for (1) assessing the performance of scanning probe microscopes (SPMs) by image processing in connection with known calibration samples that possess periodicities and symmetries in (one or) two dimensions (i.e., that possess surface features that are arranged substantially according to the mathematical rules of one of the 17 plane symmetry groups, the 17 plane gray symmetry groups, the 46 plane black-white symmetry groups, the 15 diperiodic multicolor 3D space symmetry groups, the 80 diperiodic 3D space symmetry groups, or their respective one dimensional subgroups), (2) enhancing the performance of SPMs on the basis of these assessments by improving their calibration (i.e., a procedure that may be termed "re-calibration"), (3) enhancing scanning probe microscope (SPM) images themselves by enforcing correctly determined symmetries on the intensity distribution (e.g., probe-sample interaction signal strengths) in these images, and (4) estimating a probe tip point spread function based on enforced periodicities and symmetries in specimens under investigation or calibration specimens.

The systems and methods may include, among others, (1) collecting an SPM image of the 2D (or 1D) periodic and symmetric surface of a known sample using an SPM, (2) processing the SPM image to characterize 2D (or 1D) periodicities and symmetries on the surface of the sample, and (3) enhancing the SPM image and/or performance of the SPM, using the characterized 2D (or 1D) periodicities and symmetries. The SPM, after its performance has been characterized and/or enhanced, may be used to acquire more accurate SPM images of surfaces of unknown samples. Alternatively, or in addition, correctly determined 2D (or 1D) periodicities and symmetries may be enforced on these images to remove the less than perfect influence of the microscope from these images. In other examples, a probe tip can be characterized and its characterization provided along with the probe tip for use in other SPMs.

II. COLLECTING AN SPM IMAGE

SPM images may be collected using any suitable form of SPM, including but not limited to those listed above in the Introduction. Exemplary forms include scanning tunneling microscopy (STM) and atomic force microscopy (AFM), among others. The electronic presentation of the collected SPM image may have any suitable electronic file format for storage in one or more computer readable media for storage and further processing and display. Typically, the image will consist of a set of triplets corresponding to a measured probe-sample interaction parameter such as a tunneling current (STM) or an inter-atomic force (AFM), as a function of lateral position in direct space. More than one measured interaction parameter may be connected to lateral coordinates on the sample surface. An example for this are images recorded with a spin polarized STM. Also images recorded with critical dimension SPMs consist of two lateral coordinates and one vertical coordinate that are connected to at least one interaction parameter. As used herein, an image can also refer to the display of such data for observation. The lateral position in direct space may be represented numerically by coordinates in a suitable coordinate system within a 2D unit cell. Exemplary coordinates and coordinate systems include fractional x and y coordinates and an orthogonal Cartesian coordinate system. However, more generally, the coordinates may be fractional or discrete, and the coordinate system may be orthogonal or non-orthogonal. Simple 2-by-2 matrices and translation vectors allow for a transformation between these representations of the same spatial positions of the image. Cylindrical or other coordinate systems can also be used.

III. PROCESSING THE SPM IMAGE

The SPM image may be processed to characterize 2D (or 1D) periodicities and symmetries in the surface of the sample using any suitable methods. For example, the image may be Fourier transformed from the direct two-dimensional space into the reciprocal two-dimensional space. In other words, the image may be transformed from the spatial domain, in which pixels or coordinates represent discrete spatial (e.g., x,y) positions, into the spatial-frequency (or reciprocal-wavelength) domain, in which pixels or coordinates represent discrete reciprocal positions (e.g., H,K).

Mathematically, the Fourier transformation may be expressed by the following formula:

$$F(H, K) = \sum_{j=1}^{N} I_j \cdot \exp[2\pi i(Hx_j + Ky_j)]$$
$$= |F(H, K)| \cdot e^{i\alpha(H,K)}$$
$$= A(H, K) \cdot e^{i\varphi(H,K)}.$$

Here, the subscript $j$ represents the integer labels of all image pixels, $I_j$ represents the respective intensity of these pixels, $|F(H,K)|$ or $A(H,K)$ is the amplitude (or magnitude) of the Fourier coefficient with the reciprocal space position $(H,K)$, $e^{i\alpha(H,K)}$ or $e^{i\varphi(H,K)}$ is the phase of this Fourier coefficient, and α(H,K) or φ(H,K) its phase angle. This mathematical definition shows that spatial-frequency-domain images are well suited to characterizing periodicities and symmetries in two dimensions, because the transform of a periodic and symmetric 2D direct-space image is a discrete set of complex numbers, known as the Fourier coefficients of the image intensity. These complex numbers possess amplitudes and phase angles and contain as a whole set the same information as the original image. Termination errors that might be introduced by using a mathematical series, such as the expression above, may be rendered negligible by using known mathematical procedures and by calculating the Fourier transform for a sufficiently large area of the direct space image. The cases of 2D SPM images from samples that possess periodicities and symmetries in only one dimension (1D) can be simply dealt with by dropping either H or K (i.e. setting either of these reciprocal space labels to zero in other words) in the Fourier transformation formula above and in the formulas and relations that are to follow. Similarly, either one of the direct space labels x or y may be dropped in order to deal with 2D SPM images from samples that possess periodicities and symmetries in 1D only.

The intensity and location of each pixel (i.e., a real number) in the two-dimensional image in direct space contributes to each of the Fourier coefficients (i.e., the whole set of complex numbers that represents the image in reciprocal space).

Symmetries in two dimensions in direct space are defined by groups of symmetry elements that represent rotations, mirrors, translations, and combinations of rotations and translations. For example, the following matrix represents a four-fold axis perpendicular to the image plane and located at the origin of the unit cell:

$$\begin{pmatrix} 0 & \bar{1} \\ 1 & 0 \end{pmatrix}.$$

This matrix relates in the plane group p4 all position (x,y) to their rotation symmetric equivalent positions (−y,x), (−x,−y), and (y,−x). Plane group p2 is a subgroup of p4 as the former is determined by a subset of p4, i.e., the symmetry equivalent positions (x,y) and (−x,−y). While p4 possesses a quadratic lattice, the plane group p2 has an oblique lattice. Any lattice that is associated with a two-dimensional periodic and symmetric image is defined by its unit vectors, which enclose an area that is known as the 2D unit cell. A unit vector in the direction of the x-axis relates, for example, all position (x,y) to their translation symmetric equivalent positions (x+n,y), where n is an integer. Because the set of Fourier coefficients of an SPM image represent the same information as the SPM image itself, the 2D periodicities and symmetries of the SPM image are contained in the Fourier coefficients. Consequently, mathematical relations and restrictions exist between the amplitudes and phase angles of the Fourier coefficients that are characteristic of the plane symmetry for each of the 17 plane groups (if there is just one interaction parameter connected to a lateral position as in traditional SPM). It is these symmetry relations and restrictions that allow one to identify the correct plane group of a 2D periodic and symmetric STM image from its Fourier coefficients. Centered plane unit cells require for their distinction from primitive cells of the same point symmetry content zero amplitudes for certain sets of Fourier coefficients.

At the practical level, for each plane group as numbered in the International Tables for Crystallography, amplitude ($F_{res}$) and phase angle ($\alpha_{res}$) residuals may be defined between the observed and theoretical spatial frequency-domain images by suitable mathematical relations, such as the following:

$$F_{res}^{plane\_group\_number} = \frac{\sum_{H,K} ||F_{observed}(H,K)| - |F_{plane\_group\_number}(H,K)||}{\sum_{H,K} |F_{observed}(H,K)|} \cdot 100\%$$

$$\alpha_{res}^{plane\_group\_number} = \frac{\sum_{H,K} w(H,K) \cdot |\alpha_{observed}(H,K) - \alpha_{plane\_group\_number}(H,K)|}{\sum_{H,K} w(H,K)}.$$

Here, w(H,K) is a relative weight that may be set proportional to $|F_{observed}(H,K)|$, and the sums are taken over all observed Fourier coefficient labels H and K. Alternatively, the multiplicity of certain sets of Fourier coefficients may be taken into account by additional weighting factors in both residuals.

The above-mentioned symmetry relations and restrictions are expressed here for each of the 17 plane groups symbolically as, $|F_{plane\_group\_number}(H,K)|$ and $\alpha_{plane\_group\_number}(H,K)$. These residuals (or derived residuals that take the multiplicity of certain sets of Fourier coefficients into account) may to be used as figures of merit for the identification of the most probable symmetry of an experimentally obtained SPM image.

When the Fourier coefficient amplitude $|F_{observed}(H,K)|$ is not symmetry related to other Fourier coefficient amplitudes (except to that of its so called Friedel pair, i.e. $|F_{observed}(H,K)|=|F_{observed}(-H,-K)|$), the symmetrized amplitude is set to $|F_{plane\_group\_number}(H,K)|=|F_{observed}(H,K)|$. This is obviously the case for all amplitudes in the Fourier transform of a 2D periodic image that possesses plane groups p1 or p2. Note that the amplitude residual is trivial for these two plane group, but all other plane groups possess a non-trivial amplitude residual.

Otherwise the symmetrized Fourier coefficient amplitude is calculated from (i.e. "averaged over") all symmetry-related Fourier coefficient amplitudes (including $|F_{observed}(H,K)|$ itself) according to the following relation:

$$|F_{plane\_group\_number}(H,K)| = \sum_{j}^{n} |F_{observed}^{j}(H,K)|/n,$$

where the sum is over all symmetry related amplitudes and n is the number of symmetry related Fourier coefficient amplitudes.

When a Fourier coefficient phase angle $\alpha_{observed}(H,K)$ is not symmetry related to other Fourier coefficient phase angles (except to that of its Friedel pair, i.e. $\alpha_{observed}(H,K)=-\alpha_{observed}(-H,-K)$), the symmetrized phase angle is set to $\alpha_{plane\_group\_number}(H,K)=\alpha_{observed}(H,K)$. This is again the case for all phases angles in the Fourier transform of a 2D periodic image that possesses the plane group p1. Accordingly, the phase angle residual is trivial for this particular plane group, but all other plane groups possess a non-trivial phase angle residual. (Plane group p2 is centrosymmetric and a special case of a non-trivial phase angle residual.)

Otherwise the symmetrized phase angle is calculated from (i.e. "averaged over") all symmetry-related Fourier coefficient phase angles (including $\alpha_{observed}(H,K)$ itself) according to the following relation:

$$\alpha_{plane\_group\_number}(H, K) = \arctan\left[\frac{\sum_j w^j s^j \sin\{\alpha^j_{observed}(H, K)\}}{\sum_j w^j s^j \cos\{\alpha^j_{observed}(H, K)\}}\right] +$$

$$\left\{\begin{array}{ll} 0° & \left[\text{if } \sum_j w^j s^j \cos\{\alpha^j_{observed}(H, K)\} > 0\right] \\ 180° & \left[\text{if } \sum_j w^j s^j \cos\{\alpha^j_{observed}(H, K)\} < 0\right] \end{array}\right\},$$

where the sum is over all symmetry related phase angles, $w^j$ is a weighting factor that may be set to unity or chosen proportional to $|F_{observed}(H,K)|$ and may also take the multiplicity of certain sets of Fourier coefficients into account, and $s^j=1$ if the phase angles $\alpha_{plane\_group\_number}(H,K)$ and $\alpha_{observed}^j(H,K)$ are approximately the same or $s^j=-1$ if the phases angles $\alpha_{plane\_group\_number}(H,K)$ and $\alpha_{observed}^j(H,K)$ differ by approximately 180°. This "symmetry averaging" procedure corresponds to a vector orientation averaging in the Gaussian plane of complex numbers. For the centrosymmetric plane symmetry groups and certain sets of Fourier coefficients of non-centrosymmetric groups, $\alpha_{plane\_group\_number}(H,K)$ is finally set to 0° if this angle is within the range −90°<$\alpha_{plane\_group\_number}(H,K)$<90° or 180° if this angle is in the range −90°≦$\alpha_{plane\_group\_number}(H,K)$≦180°.

To find the origin for each of the 16 higher symmetric plane groups (i.e. all plane groups that possess symmetry elements with a multiplicity that is higher than one, or simply all groups except p1), each position in the unit cell has to be tested. The amplitude and phase angle residuals are, therefore, to be calculated for each position in the unit cell for each of these 16 plane symmetry groups. The size of the unit cell in direct space is known from the size of the unit cell in reciprocal space.

Loosely speaking, the amplitude of the observed Fourier coefficient gives information on the identity of atoms, molecules, and/or other building blocks of the sample, and the phase of the observed Fourier coefficient gives information on the relative positions of the atoms, molecules and/or other building blocks. The most likely 2D periodicity and symmetry of the observed SPM image will be that with the minimal values for residuals such as those defined above.

When the multiplicity of certain sets of Fourier coefficients is taken into account and when models for the noise in the images exist, geometric Akaike information criteria can be utilized to determine the most likely plane symmetry of the observed SPM image. Theses criteria allow for distinctions between plane groups that are within a family of subgroup/supergroup relations and also between plane groups that are in different families of subgroups and subgroups. Skewed plane symmetry groups and their subgroups/supergroups can also form the basis of such geometric Akaike information criteria. The skewed plane symmetry groups arise from affine transformations of 15 of the higher symmetric plane groups, i.e. of all groups except p2 and p1.

Cross-correlation techniques can also be used to quantify the similarity between two 2D periodic and symmetric images. In the high resolution transmission electron microscopy community, it is common to use the following relation for cross-correlation coefficients $$CC(x,y)=\Sigma_x\Sigma_{y'}[i(x',y')-<i(x',y')>]\cdot[t(x'-x,y'-y)-<t>]/$$
$$(\Sigma_x\Sigma_{y'}[i(x',y')-<i(x',y')>]^2\cdot\Sigma_x\Sigma_{y'}[t(x'-x,y'-y)-<t>]^2)^{0.5}$$

where x varies from 0 to $x_{max}$, y varies from 0 to $y_{max}$, $i(x, y)$ represents the original image, $t(x, y)$ represents the template to which the image is compared, $<t>$ is the average value of the pixels in $t(x, y)$, and $<i(x', y')>$ is the average of $i(x, y)$ in the region covered by the current location of t. The denominator in this relation is a normalization factor, so that the cross correlation coefficient will not depend on differences in the intensity scale between the template and the original image. For the purpose of determining the most likely plane symmetry of an image, differently CIP symmetrized versions of this image may be used as templates. The higher the similarity between the image and its symmetrized template, the higher is the cross correlation coefficient at position x=0 and y=0, i.e. CC(0,0). The cross-correlation of an image with itself (instead of with a template) is an auto-correlation and may for a 2D periodic image facilitate in direct space the determination of its underlying 2D translation lattice.

IV. ENHANCING AN SPM IMAGE AND/OR THE PERFORMANCE OF AN SPM

The characterized 2D periodicity and symmetry of the SPM image may be used to enhance the SPM image and/or the performance of the SPM microscope, using any suitable method(s).

STM images may be enhanced by enforcing the correctly determined 2D symmetry and periodicity on the STM image. In particular, when a most likely symmetry group has been identified, based on the analysis above, the symmetry elements in the SPM image can be enforced to obtain "clearer" images of 2D periodic objects, effectively removing the less-than-ideal "influence" of the microscope on the imaging processes (inclusive or exclusive of the effects of noise). The resulting images may be improved because errant intensity is removed and/or placed where it belongs, using the correct 2D symmetry and periodicity information.

Plane symmetry enforced versions of the STM data may be obtained by a Fourier synthesis of the respective Fourier coefficients $$|F_{observed\_but\_symmetry\_enforced}(H, K)| \cdot e^{i\alpha_{observed\_but\_symmetry\_enforced}}.$$

The symmetry enforced version of the data possesses the same plane symmetry as the Fourier coefficients of the correctly identified plane group:

$$|F_{plane\_group\_correct\_number}(H, K)| \cdot e^{i\alpha_{plane\_group\_correct\_number}}.$$

Mathematically, this enforcing of a correctly identified 2D periodicity and symmetry corresponds to the removal of the not precisely known point spread function of the SPM from the SPM image. This function is convolved with the function of the sample surface 2D periodicity and symmetry. In reciprocal space, on the other hand, the Fourier transform of the SPM's point spread function is simply multiplied by the Fourier transform of the function of the sample surface 2D periodicity and symmetry. A simple division in reciprocal space has, therefore, the same effect as a deconvolution of the STM image in direct space. In practice, this division may be performed directly, by literally forming a quotient of the two functions, or indirectly, by using more involved techniques, such as iteration or constrained iteration, which can reduce numerical instabilities.

The performance of SPM microscopes may be enhanced in at least two ways. First, using a sample of known 2D (or 1D) periodicity and symmetry as a calibration standard, the performance of the microscope may be assessed by comparing measured data with predicted data, so that shortcomings in SPM images can be noted and accommodated. Second, again using a sample of known 2D (or 1D) periodicity and symmetry, the performance of the microscope may be improved by adjusting the microscope settings to reduce or minimize the difference(s) between the actual SPM image and the predicted SPM image based on the known 2D (or 1D) periodicity and symmetry of the calibration sample. The properly adjusted microscope may be used, after this calibration, with unknown, even non-periodic, samples. This, in turn, may allow better experimental SPM data to be obtained from samples with unknown surface structures. In some examples, calibration data can be applied so as to control scanning to produce a more linear or otherwise preferred scanning.

In practice, using such a calibration standard, SPM images may be recorded of periodic arrays of molecules of known 2D point symmetry and mutual alignment that represent one of the 16 higher symmetric plane symmetry groups. These images may be processed by image processing methods, such as those described above, and the controls of an SPM microscope may be adjusted until the software identifies the correct plane symmetry and periodicity for the calibration standard with a high combined figure of merit. The figure of merit may have a Fourier coefficient amplitude residual component and/or a phase angle residual component, as described above, particularly if it is based on the Fourier coefficients of the STM image. Additionally, the figure of merit may have a component that is based on a geometric Akaike information criterion and/or a cross correlation in direct space.

V. PROBE TIP DECONVOLUTION

The SPM imaging process results unavoidably in a convolution of a scanning probe tip function that includes its geometry (and possible asymmetry or dissymmetry) with the respective function of the features of the sample surface that include their geometry (and possible 2D periodic symmetry). It is, therefore, typically important that the physical dimensions of this tip are much smaller than the surface features to be probed. If the scanning probe tip is laterally wider than the surface features, the SPM image will be composed of representations of the tip as probed by the sample surface features. This is particularly a problem in AFM imaging, although a so called "blunt STM tip" may also be imaged inadvertently by sample surface atoms.

Deconvolution of the scanning probe tip size and geometry, i.e. so called "tip dilation", in order to recover more genuine features of the sample surface is common practice in SPM imaging and scanning probe tip size and geometry deconvolution are particularly important for AFM imaging. STM imaging, on the other hand, relies ideally on a single protruding orbital of a single atom (at an atomically sharp apex of the scanning probe tip) and lateral dimensions of a STM tip are ideally very small so that lateral resolution of approximately 0.1 to 0.2 nm, i.e. genuine surface atom resolution, can be obtained for the surface atoms of different kinds of conducting materials. As a drawback, STM can typically only be employed on more or less atomically flat surface areas. Scanning probe tips that approach as much as possible the ideal geometry and symmetry of an infinitely sharp needle, i.e. point group $\infty m$ are preferred. This means that a SPM tip needs to be "narrow", possess a very high aspect ratio as well as a very high curvature at the apex. If indeed the scanning probe tip were to be described by a 2D Dirac delta function, which possesses this point symmetry and no lateral dimension, the sample surface features would be imaged by SPM without tip induced artifacts.

Close to this ideal are effective STM tips that are composed of just one protruding orbital of one atom which is itself sufficiently protruding from some real tip surface so that tunneling into or out of other atoms on the tip surface is insignificant. A blunt STM tip may be composed of many "mini-tips", i.e. atomic protrusions that act as tunneling sites simultaneously. Such a blunt STM tip may be much wider laterally than the spatial extent of the individual atomic surface features it is supposed to image. An estimate of the "shape" of a blunt STM tip may be obtained directly from an STM image by applying the reciprocity principle of SPM imaging (i.e. "an image of microscopic scale may be interpreted either as by probing the sample state with a tip state or by probing the tip state with a sample state").

Utilizing crystallographic image processing, a deconvolution can transform a blunt STM tip into an approximation of its atomically sharp counterpart. The underlying principles are thereby that an estimate of the SPM's prevalent point spread function is obtained from a 2D (or 1D) periodic and preferentially highly symmetric sample surface and that the effects of this function are subsequently removed from the SPM image. The term crystallographic image processing (henceforth abbreviated as CIP) originated with the electron crystallography community. Since one may define 2D image-based crystallography independent of the source of the 2D patterns as being concerned with categorizing, specifying, and quantifying 2D spatially periodic, perfectly long-range ordered patterns, CIP is also a good term for procedures as applied to SPM images of 2D (or 1D) periodic and symmetric objects.

Similar to the theories of 3D X-ray or electron diffraction crystallography, the theory of 2D image-based crystallography applies also to finite spatially and temporally averaged patterns. The averaging over many periodic motifs of which a few may be "defective" results in the determination of a structure that is considered as being essentially free of defects but close to the ideal (defect free) structure. The defects themselves may be either local, e.g. vacancies at the repeating motif level, or concern the whole pattern, e.g. overall 2D geometric distortions and the effects of a possible scanning probe tip asymmetry or dissymmetry. The real pattern is then a combination of the ideal pattern with some additional quantitative measure of the effects of the defects. This is all analogous to the concepts of quantified ideal and real crystal structures in materials science. (Note also that the overall deviation of an experimentally determined and refined crystal structure from the ideal crystal structure is quantified in diffraction based crystallography.) In this disclosure, local defects are generally disregarded, and only defects that affect the whole pattern as being caused by the imperfections of the SPM imaging process alone are considered. These imperfections result then in an effective point spread function of the microscope for a set of experimental imaging conditions including the effective scanning probe tip, which may be blunt. Obtaining an estimate of this function and correcting for the effects of this function become then part of CIP. As convenient examples, CIP on regular 2D arrays of hexaazartriphenylene-hexacarbonitrile (HATCN) molecules on silver (111), fluorinated cobalt phthalocyanine ($F_{16}CoPc$) molecules on graphite (0001), and Co(II) phthalocyanine molecules on gold is demonstrated. While the former epitaxial system is strongly interacting, there are only weak interactions between the substrate and deposit in the latter system. Point symmetry breaking of the individual molecules is, therefore, to be expected for the HATCN/silver system, while it is unlikely for the $F_{16}$CoPc/graphite system.

CIP is widely employed by the electron crystallography community to aid the extraction of structure factor amplitudes and phase angles from high resolution phase contrast images of crystalline materials and the correction of these images for the effects of the phase contrast transfer function, two-fold astigmatism, beam tilt away from the optical axis of the microscope, and sample tilt away from low indexed zone axes. Such images are to be recorded with parallel illumination in a transmission electron microscope (TEM). Neglecting quantum and relativistic effects, all pixels in such TEM images are recorded at the same time (or in other words in parallel). The product of all of these "aberration functions" may be considered as the Fourier transform of the point spread function of the microscope under the prevalent experimental conditions. The effect of this point spread function can be removed, reduced, or at least partially compensated by the enforcing of a correctly determined 2D symmetry.

Analogous procedures can be applied to a variety of applications including Z-contrast scanning transmission electron microscopy (STEM), scanning electron microscopy (SEM), STM, or other types of SPMs as given in the table above. Note that the recording of images in these types of microscopes is of a serial nature so that there may also be aberrations and noise in the time domain.

For such applications, symmetries associated with the mathematically defined symmetry groups for 2D (or 1D) periodic entities that may exist in nature can be used. As sixteen of the plane symmetry groups possess more point symmetry elements than the identity element, these groups are referred to as "higher symmetric plane groups." For convenience, the so-called (short and full) international (Hermann-Mauguin) notations for both point and plane symmetry groups are used. The full international notation allows also for the consideration of non-standard orientations of mirror or glide lines for plane groups pm, pg, cm, and p2mg. In these plane groups with rectangular lattices, mirror or glide lines can be oriented either perpendicular to the x-axis (i.e. in their standard setting) or perpendicular to the y-axis and this is to be expressed by different sequences of numbers and letters in the full international plane group symbols. This has its advantages for the execution of the CIP procedures, will be used in Table 1 below, and formally increases the number of distinct plane group symbols to 21 (while there are only 17 plane groups).

In order to enforce the most likely plane symmetry on an experimental SPM image and remove geometric distortions in the process, one typically first quantifies the deviations of the image from the respective 16 higher symmetric plane symmetries and then decides which plane group to enforce. The quantification of the deviations of an experimental image from the plane symmetries of the higher symmetric groups is done objectively by CIP. The decision on which plane group is the most likely may be based on the results of CIP alone, or on the results of the application of geometric Akaike information criteria or cross correlations, or combinations of the results of one or more of these methods and procedures. The decision on which plane group is the most likely may, however, be somewhat subjective for heavily distorted images, especially when only poor models for the prevalent noise in the images are available. The correction of the deviations of an image from any possible plane symmetry is again fully objective.

Provided that an image is periodic in 2D (or 1D), a discrete set of Fourier coefficients of the image intensity represents the image in reciprocal space. The amplitude (A) and phase angle (φ) of the Fourier coefficients of the image intensity have to obey certain symmetry relations and restrictions in order to belong to one of the 16 higher symmetric plane groups. Centered lattices and glide lines lead to "systematic absences" (also referred to as "extinctions" in reciprocal space), i.e. certain Fourier coefficients must be zero if the 2D image is to belong exactly to the respective plane symmetries.

In order to quantify deviations from the 16 higher symmetric plane groups, Fourier coefficient amplitude ($A_{res}$) and phase angle ($\phi_{res}$) residuals may be defined by relations similar to those shown and discussed above for the residuals $F_{res}$ and $\alpha_{res}$. Alternatively, one may define a "glide factor", which is for plane groups p1g1 and p2mg equal to the reciprocal space label K and for plane groups p2gg and p4gm equal to the sum of the labels H and K, utilize the relation $$\varphi_{plane\_group\_number}(H, K) = \arctan\left[\frac{\sum_j w^j s^j \sin\{\varphi^j_{observed}(H, K)\}}{\sum_j w^j s^j \cos\{\varphi^j_{observed}(H, K)\}}\right] + \left\{\begin{array}{l} 0° \quad \left[\text{if } \sum_j w^j s^j \cos\{\varphi^j_{observed}(H, K)\} > 0\right] \\ 180° \quad \left[\text{if } \sum_j w^j s^j \cos\{\varphi^j_{observed}(H, K)\} < 0\right] \end{array}\right\},$$

and set $s^j=-1$ when the glide factor is odd or $s^j=1$ when this factor is even.

Since certain plane groups require certain 2D lattices, it is convenient to determine the approximate type of lattice (oblique, rectangular primitive, rectangular centered, square, or hexagonal) first and then to calculate Fourier coefficient amplitude and phase angle residuals only for the respective plane groups and all of their subgroups in lower symmetric lattices. The determination of the approximate lattice type can be based on the reciprocal lattice as obtained from the Fourier transform of the image intensity. (Rectangular lattices can be either primitive or centered and procedures for dealing with these two alternatives are provided below.)

When an observed Fourier coefficient amplitude is not symmetry related to other observed Fourier coefficient amplitudes (except to that of its Friedel pair), the symmetrized amplitude magnitude is set equal to its observed counterpart. Otherwise the symmetrized Fourier coefficient amplitude of "reflection" (H,K) is averaged over all (n) observed symmetry-related Fourier coefficient amplitudes with indices (H',K') including the observed Fourier coefficient amplitude of the original reflection (H,K). When an observed Fourier coefficient phase angle is not symmetry related to other observed Fourier coefficient phase angles (except to that of its Friedel pair), the symmetrized phase angle is set equal to its observed counterpart. Otherwise the symmetrized phase angle is averaged over all observed symmetry-related Fourier coefficient phase angles.

While all phase angles have to be either 0° or 180° for the 10 centrosymmetric plane symmetry groups, this restriction applies only to subsets of the Fourier coefficients for plane groups pm, pg, cm, p3m1, and p31m. (Plane groups p3 and p1 do not possess any Fourier coefficient phase angle restrictions.) Where required by the plane symmetry group, the respective symmetrized phase angle is finally set to 0° if this angle is within the range smaller than −90° or 90°. If, on the other hand, this angle is larger than (or equal to) −90° or 90°, it is finally set to 180°. While the amplitudes of the Fourier coefficients are theoretically independent of the point about which a Fourier transform is calculated, the phase angles of the Fourier coefficients are always defined with respect to the chosen origin in reciprocal space (about which the Fourier transform has been calculated). One needs, therefore, to shift this origin to the crystallographic origin of the 16 higher symmetric plane groups. This can be done by calculating the phase angle (and amplitude) residual(s) for each pixel in the 2D unit cell as determined in the previous 2D lattice determination step and by picking the lowest of these phase angle residuals (together with the respective amplitude residual) as representative of the respective group at the crystallographically defined origin. This so called "origin refinement" identifies the one pixel (and all of its translation equivalent pixels) in the unit cell of the direct space 2D image about which the respective plane symmetry is the least broken. (For plane groups that do not contain a two-fold or higher-fold rotation point, these pixels will lie on straight lines.)

The amplitude residual is trivial for plane group p2, i.e. equal to zero and meaningless. This is because the only symmetry relation between the amplitudes of the Fourier coefficients of the image intensity in this group is $A(H,K)=A(-H,-K)$, which is a property of the Fourier transform itself. (In X-ray crystallography, an analogous relation is a consequence of Friedel's law, which holds for single scattering when the diffraction can be modeled by a Fourier transform.) While $\phi(H,K)=-\phi(-H,-K)$ is also a property of the Fourier transform, the phase angle residual for plane group p2 is still meaningful because all phase angles are restricted by the centrosymmetry of this plane group to be either 0° or 180°. Provided that an image possesses a sufficient number of spatial periodicities in direct space, i.e. possess a sufficient number of Fourier coefficients in reciprocal space, the amplitude and phase angle residuals of the Fourier coefficients of a 2D-image are likely to be different for each of the 14 higher symmetric plane groups that are based on primitive lattice. Note that while the relations for the residuals are valid for all 16 higher symmetric plane groups, and vector averaging in the Gaussian plane of complex numbers remains the same, different sets of Fourier coefficients are averaged and phase angle restricted (when restrictions apply) for the 14 higher symmetric plane groups that are based on primitive lattices. The Fourier coefficient amplitude and phase angle residuals provide, thus, powerful quantitative measures to identify the most likely plane symmetry group that a 2D periodic image may possess when the geometric distortions are removed. In addition, one can define a so called $A_o/A_e$ ratio for those 6 plane groups that possess systematic absences. This ratio is defined as the amplitude sum of the Fourier coefficients that are forbidden by the plane symmetry but were nevertheless observed ($A_o$), i.e. so called "forbidden reflections," divided by the amplitude sum of the observed Fourier coefficients ($A_e$) that are allowed by the plane symmetry. An $A_o/A_e$ ratio larger than zero, thus, means that plane group forbidden Fourier transform coefficients are actually present with an amplitude greater than zero. This makes this ratio (for the six plane groups for which it is applicable) an additional measure to quantify deviations of the symmetry of an image and helps in the identification of the most likely plane symmetry group that a 2D periodic image may possess when the geometric distortions are removed.

Note that systematic absences are due to both glide lines and cell centering. The $A_o/A_e$ ratio, thus, allows one to distinguish the plane groups cm and c2mm from the plane groups pm and p2mm, respectively. One can, thus, distinguish between all 16 higher symmetric plane groups on the basis of a combination of the $A_o/A_e$ ratio with the Fourier coefficient amplitude and phase angle residuals. For an exact adherence of an image to one of the 16 higher symmetric plane groups, both the amplitude and phase angle residuals need to be zero. In addition, for an exact adherence of an image to one of the 6 plane groups that possess systematic absences the $A_o/A_e$ ratio needs to be zero. Such an exact adherence of an experimental image to an abstract mathematical definition of symmetry is not to be expected. Roughly speaking, this would correspond to a geometric measurement without any systematic and random errors. For plane group p1, both residuals are trivial since there is only translation symmetry and the identity point symmetry element, i.e. a one-fold rotation point. Consequently, there are neither symmetry relations nor restrictions between the Fourier coefficients of the image intensity (that would result from other point symmetry elements and also no forbidden reflections due to cell centering or glide lines). (A strictly 2D periodic and symmetric image that belongs to one of the 16 higher symmetric plane groups that is distorted in a "strictly regular" geometric way which obeys the mathematical definition of an affine transformation belongs to a skewed plane symmetry group. Obviously, experimental images are not likely to obey such strict distortion conditions perfectly either.)

Low Fourier coefficient amplitude and phase angle residuals, together with very low or zero $A_o/A_e$ ratios (when the latter measure is meaningful) form the basis for the decision as to which plane group an experimental image most likely belongs. One also needs to take the multiplicity (M) of the general position into account. This multiplicity ranges from 2 to 12 and is the higher the more symmetry elements exist in the plane group. Group-subgroup relations must also be considered.

The general rule is that the most likely plane group is the one with the highest multiplicity within a set of group-subgroup related plane groups that at the same time has reasonably low Fourier coefficient amplitude and phase angle residuals combined with very low or zero $A_o/A_e$ ratios (if this ratio is meaningful). Typically, the phase angle residual is more valuable than the amplitude residual for considering which plane group an experimental image most likely belongs to because Fourier coefficient phase angles are somewhat more directly associated with the local distribution of the intensity in an image.

Frequently, the plane group to which an experimental image belongs is known in advance and the CIP procedure is mainly used to enhance the signal to noise ratio by plane symmetry averaging in reciprocal space and Fourier back transforming into direct space. Other cases of prior knowledge of the plane group of the sample surface features concern dedicated SPM calibration samples.

For the symmetrization of a blunt STM tip, it is often sufficient to possess prior knowledge of the point group symmetry of the isolated (and, therefore, undisturbed) entity that will form the motif (or a part of the motif) when it is arranged in a 2D periodic way. One then may assume in addition that the full point symmetry of the isolated entity will be retained when it becomes the periodically repeated motif (or a part thereof) in a 2D pattern. This should be the case in weakly interacting epitaxial systems such as a monolayer of $F_{16}CoPc$ molecules on highly (0001) oriented pyrolytic graphite.

To summarize, Fourier coefficient amplitude and phase angle residuals combined with $A_o/A_e$ ratios provide objectively quantified deviations of symmetry in 2D (or 1D) and allow for the identification of a most likely symmetry group to which an experimental SPM image would belong when all geometric distortions and scanning probe tip asymmetries or dissymmetries were removed. Preferably, quantified deviations from the symmetry need to be small, i.e., the geometric distortions to the ideal SPM image need to be small.

Plane symmetry enforcing on an SPM image consists of the Fourier back transforming of the symmetrized Fourier coefficients rather than of the observed Fourier coefficients of the image intensity. The symmetrized Fourier coefficients are obtained, including the setting of the phase angles to 0° or 180° (where applicable) for the crystallographic origin of the respective plane group as defined and as obtained from the origin refinement procedure. In other words, the lowest Fourier coefficient phase angle residual together with the respective Fourier coefficient amplitude residual of the respective plane group need first to be obtained for a SPM image about the translation equivalent points (or sets of points) for which the respective plane symmetry was the least broken. One of these points is subsequently taken as the new origin about which a Fourier synthesis is calculated with the observed Fourier coefficients replaced by the symmetrized Fourier coefficients. Since there are no point symmetry elements in plane group p1 besides the identity element and no restrictions on the geometry of the 2D lattice, there is no "genuine" plane symmetry enforcing procedure for this group. Fourier filtering (that is also known as optical filtering) may be considered as being conceptually equivalent to translation averaging over the periodic motif without enforcing any additional symmetry. Since only the averaged translation symmetry will be enforced in a Fourier back-transform of non-symmetrized Fourier coefficients, the Fourier filtering is equivalent to "quasi" p1 plane symmetry enforcing. Noise suppression results from translation averaging over the periodic motif in an image. This noise suppression stems from the fact that noise is non-periodic.

Translation symmetry enforcing of a STM image alone (as in p1 enforcing) amounts to averaging of the image intensity of all pixels (x,y) that are related by the translation symmetry, i.e. $i(x,y)=i(x+1a,y)=i(x,y+1b)=i(x+1a,y+1b)+ \ldots i(x+Na,y)=i(x,y+Nb)=i(x+Na,y+Nb)$ for primitive lattices, wherein N is the number of unit cells and a,b are basic translation vectors of the unit cell (in direct space). It is apparent that the more unit cells there are in an experimental SPM image, the better the results of the translation averaging (and the more non-periodic defects and noise can be tolerated as they and it are effectively averaged out.) Plane symmetry enforcing of the 16 higher symmetric groups does, however, add the benefits of "point symmetry averaging" to the benefits of translation averaging.

All point symmetry related image positions (x,y) in a unit cell of a higher symmetric plane group must possess the same intensity. The higher the plane symmetry, the more restrictions on the distribution of the intensity in the image exists in addition to the translation symmetry. Plane group p6$mm$ possesses, for example, per unit cell, 12 asymmetric units per motif that all must have the same intensity in direct space, i.e., $i(x,y)=i(-y,x-y)=i(-x+y,-x)=i(-x,-y)=i(y,-x+y)=i(x-y,x)=i(-y,x)=i(-x+y,y)=i(x,x-y)=i(y,x)=i(x-y,-y)=i(-x,-x+y)$. In Fourier space, this transforms into $A(H,K)=A(K,-H-K)=A(-H-K,H)=A(-H,-K)=A(-K,H+K)=A(H+K,-H)=A(K,H)=A(H,-H-K)=A(-H-K,K)=A(-K,-H)=A(-H,H+K)=A(H+K,-K)$. In addition, all Fourier coefficient phase angles are restricted for plane group p6$mm$ to be either 0° or 180° and the relations
$\phi(H,K)=\phi(K,-H-K)=\phi(-H-K,H)=-\phi(-H,-K)=-\phi(-K,H+K)=-\phi(H+K,-H)=\phi(K,H)=\phi(H,-H-K)=\phi(-H-K,K)=-\phi(-K,-H)=-\phi(-H,H+K)=-\phi(H+K,-K)$ are valid.

Plane symmetry enforcing results in averaging, in direct space, image intensity over all point symmetry as well as all translation symmetry and also the averaging of the symmetry related Fourier coefficient amplitudes and phase angles of the image intensity in reciprocal space. (The latter averaging also includes setting the phase angles to the nearest of 0° or 180° where such restrictions are imposed by the plane group symmetry.) The averaging is done over the intensity of all symmetry related pixels of the whole image so that the respective point and translation symmetry conditions (and restrictions) are all fulfilled.

An alternative view is that enforcing a higher symmetric plane symmetry (other than pm, pg, and cm) on an image results in the periodic motif being placed with its central rotation point (the projection of a rotation axis which is oriented perpendicular to the x-y plane) on the crystallographic origin and at all translation invariant positions of that plane group. In all cases, the respective point symmetry of the motif along with the respective site symmetries of all other points in the image and the translation symmetry of the motif are all enforced by the plane symmetry group enforcement procedure.

Combining point symmetry averaging with translation averaging to plane symmetry enforcing for the 16 higher symmetric groups results in "more averaging" for the same number (N) of periodic motifs. For all positions in the unit cell with site symmetry 1, the N fold averaging is extended by a factor M, which represents the multiplicity of the general position of the respective plane group. One may also say that plane symmetry enforcing for the 16 higher symmetric groups means that one averages over all N·M asymmetric units in the whole image rather than over all N unit cells. The benefit of this "extended averaging" is obviously a better noise and (non-periodic) defect suppression than what can be achieved by translation averaging (also known as Fourier or optical filtering) over the same (N) number of unit cells alone.

This leads to the alternative view that the enforcing of the correct plane symmetry results in the effective removal of all kinds of geometric distortions and noise, including effects of multiple mini-tips from an experimental SPM image. The "effective sum" of all geometric distortions is considered to be caused by the prevalent point spread function of the microscope.

On the basis of the reciprocity principle of SPM imaging, plane symmetry enforcing on a SPM image can also be considered as being equivalent to scanning probe tip symmetrization. Utilizing Pierre Curie's symmetry principle (i.e. the symmetry of a crystal under the influence of a physical probe is the intersection of the symmetry group of the probe and the symmetry group of the crystal without the influence of the probe) we can make the general statement that the point symmetry of the symmetrized scanning probe tip will always be the highest allowed site symmetry of the plane group that has been CIP enforced on an SPM image. Also the translation symmetry of the symmetrized scanning probe tip will be that of the enforced plane symmetry. Thus, a preferred calibration sample should possess as high a plane symmetry group as available in order to be of the best possible use.

To summarize: plane symmetry enforcing of the 16 higher symmetric plane groups results simultaneously in both translation averaging and point symmetry averaging for each individual pixel in an experimental SPM image. The plane symmetry enforcing procedure works better the higher the plane symmetries of the imaged 2D periodic object and the more unit cells are available for the averaging. Various kinds of (non-periodic) defects in the periodic motif and noise can then be readily averaged out or reduced in magnitude by averaging.

If the plane symmetry of the 2D periodic sample surface feature or object is not known in advance, actual deviations of the SPM images from a more or less truthful representation of the sample including the effects of noise need to be small for the plane symmetry enforcing procedures to be justifiable and meaningful.

When good models exist for the noise in either the spatial domain or the time domain or in both domains, it makes sense to apply suitably constructed Wiener Filters to the SPM image before or simultaneously with the execution of translation averaging and plane symmetry enforcing procedures. There may also be different models for the noise in the slow and fast scanning directions of a SPM.

As mentioned above, the convolution of the effective scanning probe tip function, $f_{tip}(x,y)$ with the sample surface feature function $f_{sample}(x,y)$ is unavoidable in the process of recording a raw SPM image with intensity $i_{raw}(x,y)$. Mathematically, this Fourier convolution can be expressed as $i_{raw}(x,y)=f_{sample}(x,y)*f_{tip}(x,y)$, wherein x and y stand for the real space coordinates of pixels in the 2D scanning plane, all functions are considered to be time independent, and noise is ignored. The entire SPM and its influence on the imaging process during one experiment contribute to the effective scanning probe tip. The raw intensity $i_{raw}(x,y)$ can be interpreted as either being due to the tip probing the sample or the sample probing the tip in accordance with the reciprocity principle of SPM imaging.

Provided that there is a sufficiently high number of pixels in $i_{raw}(x,y)$ so that this function can be approximated as a set of infinitely close spaced image points, we have in Fourier space, the relation $I_{raw}(H,K)=F_{sample}(H,K) \cdot F_{tip}(H,K)$. When the time domain noise is negligible and decoupled from the geometrical distortions as obtainable in the limit of slow scan speeds, $f_{tip}(x,y)$ and $F_{tip}(H,K)$ represent a set of prevalent SPM operating conditions and the geometry (and possibly asymmetry or dissymmetry) of the scanning probe tip itself. These instrument and experiment specific functions can then be considered as being nearly translation invariant, i.e. approximately the same for each pixel in an image. With negligible and decoupled time domain noise, the SPM imaging process is linear, i.e. the image of the sum of all surface features is equal to the sum of the corresponding images of the individual surface features.

Prior knowledge of either $F_{sample}(H,K)$ or $F_{tip}(H,K)$ allows one to determine the other by a simple division in Fourier space, e.g., $F_{effective\ tip}(H,K)=I_{raw\ of\ known}(H,K)/F_{known\ sample}(H,K)$, wherein the subscripts have been renamed for increased specificity. The subscript "effective tip" refers to a specific scanning probe tip that produced the raw image of a specific known sample with a direct space surface sample function $f_{known\ sample}(x,y)$.

When the prior knowledge concerns the plane symmetry of a 2D (or 1D) periodic and highly symmetric calibration sample, the symmetry enforcing procedure results in a SPM image that represents the symmetry of the known sample surface features nearly truthfully, i.e. $I_{symmetry\ corrected}(H,K)$ is approximately equal to $F_{sample\ with\ known\ plane\ symmetry}(H,K)$, with $F_{symmetry\ enforced\ tip}(H,K) \sim 1$ and $f_{symmetry\ enforced\ tip}(x,y) \sim \delta(x,y)$, wherein $\delta(x,y)$ represents a 2D Dirac delta function. These relationships are special "calibration sample versions" of relations shown above and can be considered as referring to an ideal SPM tip that is experimentally approached but not reached.

After the enforcing of the plane symmetry of the known calibration sample, one can describe an effective probe tip with $F_{effective\ tip}(H,K)=I_{raw\ of\ known}(H,K)/I_{symmetry\ corrected}(H,K)=F_{PSF}(H,K)$ or $\{F_{effective\ tip}(H,K)\}^{-1}=I_{symmetry\ corrected}(H,K)/I_{raw\ of\ known}(H,K)=F_{invPSF}(H,K)$ to estimate the Fourier transform of the point spread function $F_{PSF}(H,K)$ (or its inverse function) experimentally for a certain scanning probe tip and a certain set of experimental conditions of the SPM. The estimate of the Fourier transform of the inverse point spread function $F_{invPSF}(H,K)$, can be used directly for correcting images of unknown samples that possess the same real space 2D periodicities as the calibration sample. These images are preferably recorded with the same scanning probe tip and under the same experimental conditions either prior to or after the recording of the SPM image of the unknown. Thus, $I_{corrected\ of\ unknown}(H,K)=I_{raw\ of\ unknown}(H,K) \cdot F_{invPSF}(H,K)$. Of course, as noted above, the corrected and raw data as well as estimated point spread functions and the associated Fourier transforms are approximations due to measurement errors.

VI. EXAMPLES

The systems and methods disclosed herein may include, among others, (1) methods of assessing and improving the performance and/or calibrating the correctness of SPMs, (2) software, and/or calibration standards of known 2D (or 1D) periodicity and symmetry, for enhancing SPM images and/or improving the performance of SPM microscopes, (3) kits comprising software and one or more calibration standards, or a plurality of calibration standards with different known properties, and (4) SPM microscopes and/or storage media loaded with the software. The calibration standards, which may comprise 2D periodic and symmetric arrays of molecules on a suitable surface or substrate, such as silicon, mica, $BaF_2$, silver, gold, $MoS_2$, $WSe_2$, or graphite may allow point and plane symmetries of molecules to be quantified experimentally, with samples of known structure, so that after a (re-)calibration of the SPM, better experimental data may be obtained from samples with unknown structure. Calibration standards may be constructed and/or selected to span the expected demands to be placed on an SPM image and/or an SPM microscope. For example, the preferred calibration standards may have a 2D (or 1D) periodicity and symmetry representative of that expected (or bracketing that expected) in the sample, the standards may have intensities levels and/or distributions representative of those expected (or bracketing those expected) in the sample, and so on. The software may be designed to perform manually, with user input, and/or automatically. In some embodiments, the software may adjust the microscope automatically, based on input from the calibration standard(s). Typically, a series of computer executable instructions are stored on one or more computer readable media.

SPM Calibration

FIG. 1 is a schematic view of a scanning tunneling microscope 100 that includes a probe tip 102 that is coupled to one or more piezoelectric, mechanical, or other translation devices 104 that are coupled to a scan controller 106. In other examples, a specimen 108 is scanned with respect to the probe tip 102, or both are scanned. As the probe tip 102 is scanned with respect to the specimen 108, electrical signals associated with the scanning (for example, tunneling currents) are amplified, filtered, or otherwise processed by an amplifier 110 and coupled to the scan controller 106. Scan data can be recorded as image data based on electrical currents or other tip-related electrical signals in association with position data corresponding to scan control data. Such images can be stored at the scan controller 106 or coupled to a personal computer or other computer system such as those described below. Images can be coupled to a display 112 for presentation to a user, or printer or otherwise processed. In some examples, a calibration/image enhancement system 114 is provided to, for example, linearize or otherwise adjust scan parameters, or process calibration data based on one or more calibration samples. In some cases, the system 114 is configured to process one or more images from known SPM calibration samples with 2D periodic and highly symmetric features to (1) assess the performance of the microscope; (2) remove or compensate for at least a portion of the influence of the "less than perfect" imaging process of the microscope from data obtained from the calibration sample; and (3) record images from unknown samples and enforce one or more plane symmetry groups on associated image data. Such processing can also be done at the controller 106, or performed at a combination of local or distributed processing devices. Typically, more accurate SPM calibration results are expected for calibration samples that possess an extended regular array of substantially identical groups of atoms or molecules.

The apparatus of FIG. 1 can also be employed in a "bootstrapping" approach where the prevailing point spread function of the scanning probe microscope is estimated in situ and used to correct scans and images of progressively larger sample areas subsequently until no further improvement or small or limited improvement is obtained by the enlarging of the scanned sample area.

Figure 2:
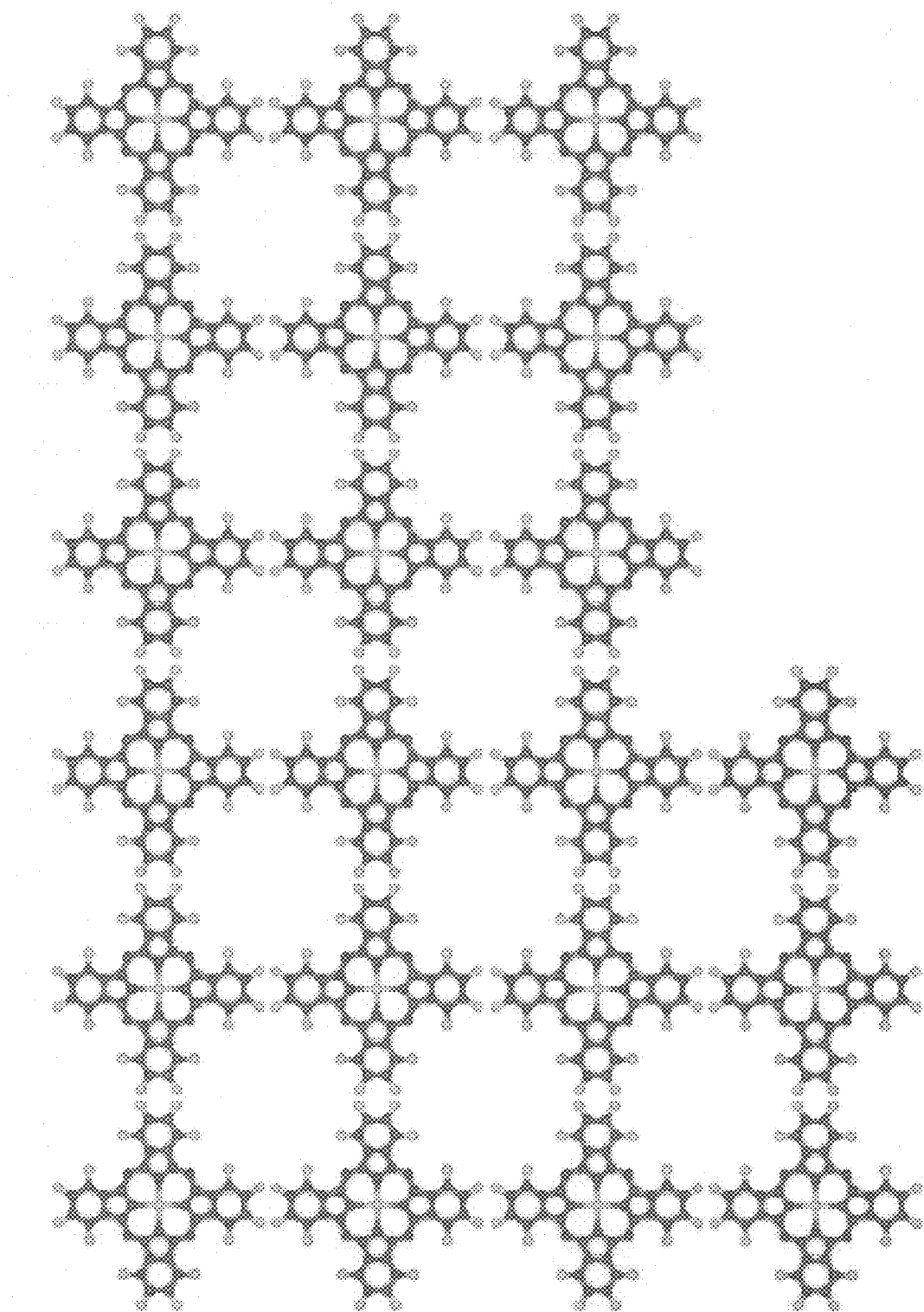
FIG. 2 is a schematic view of a square array of fluorinated cobalt phthalocyanine ($F_{16}CoPc$) molecules suitable for use as a calibration standard.

One example calibration sample is illustrated in FIG. 2. FIG. 2 illustrates an exemplary array of dye molecules on a surface, specifically, a regular array of fluorinated cobalt phthalocyanine ($F_{16}CoPc$) molecules, suitable for use as a calibration standard.

it would not have been possible to image this epitaxial system at 300 K in the scanning probe microscope. On the other hand, STM imaging at room temperature at molecular resolution may result in images that possess several hundred Fourier coefficients of which the vast majority has very low amplitudes. The CIP processing of these images may then require the removal of spurious detail in addition to the removal of noise by plane group symmetrizing at discussed above.

Figures 4A, 4B, 4C, 4D, 4E, 4F:
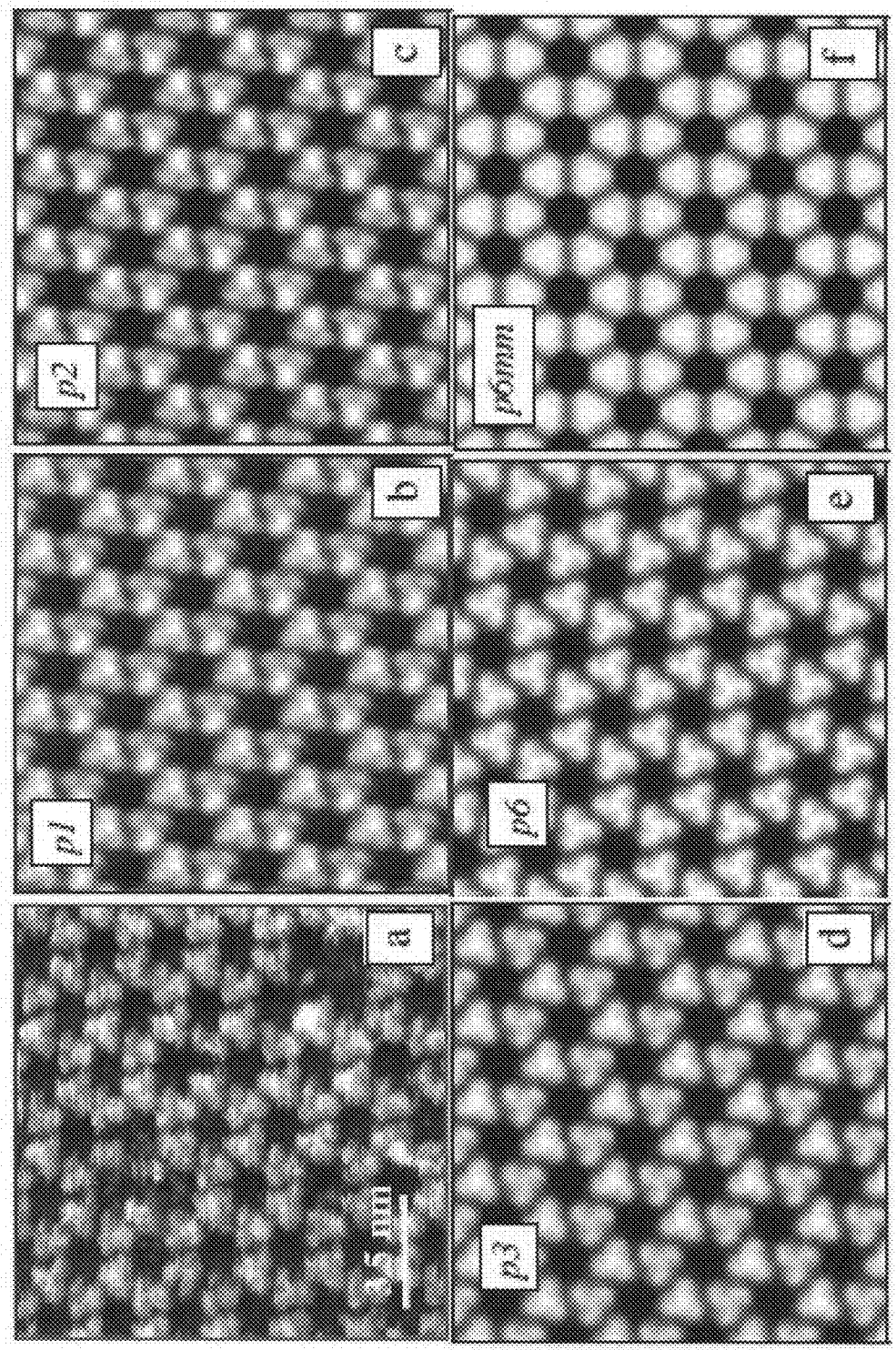
FIGS. 4A-4F are STM images of a monolayer of HATCN molecules on silver (111), 512 by 512 pixels, in constant tunneling current mode, tip bias at −1 V (with respect to the more positive sample), at a 0.3 nA tunneling current.

The STM image of FIG. 4A was processed by CIP using the commercially available software CRISP. A circular mask of 512 pixels (comprising approximately 60 molecules) was imposed on the raw data and the Fourier transform of the selected area was calculated. Additional noise and spurious detail filtering of the Fourier coefficients was also done. The p/enforced version of the STM data, shown in FIG. 4B, was created by a Fourier synthesis of the unaltered Fourier coefficients. The plane symmetries of the groups p2, p3, p6 and p6mm were enforced on the Fourier coefficients before the respective Fourier syntheses were carried out and the resulting images are shown in FIGS. 4C-4F, respectively. A quantification of the deviation of the above mentioned four plane groups and plane groups pm and pg (in two different settings) is given in Table 1. Note that the Fourier coefficient phase angle residuals combined with the multiplicity are typically more valuable as indicators as to how severe a certain plane symmetry is violated. For plane group pg, there was an $A_o/A_e$ ratio of 1 for both settings, indicating that the deviation from this symmetry is quite severe.

TABLE 1

| | Fourier coefficient amplitude and phase angle residuals for plane group p6mm and some of its subgroups. | | | | | | | | | |
|---|---|---|---|---|---|---|---|---|---|---|
| | p2 | p1m1 | p11m | p1g1 | p11g | p3 | p3m1 | p31m | p6 | p6mm |
| $A_{res}$ in % | | 30.9 | 30.9 | 37.3 | 38.6 | 24.9 | 32.9 | 32.9 | 24.9 | 32.9 |
| $\phi_{res}$ in ° | 12.8 | 15.2 | 13.0 | 7.9 | 18.4 | 11.6 | 17.9 | 18.2 | 14.1 | 18.0 |

FIG. 3A shows an original "raw" STM image of a regular array of $F_{16}CoPc$ molecules, such as that shown schematically in about the same orientation as in FIG. 2. FIG. 3B shows an enhanced, corrected, or compensated version of the image of FIG. 3A in which p4mm symmetry has been enforced. The enhanced or corrected image of FIG. 3B clearly reveals atomic details of the molecular arrangement, demonstrating the utility of the present teachings. The central Co atoms of these molecules appear brightest; and "empty spaces" between the atoms and molecules appear the darkest. FIGS. 3A-3B and FIG. 2 are shown to different scale for convenient illustration, but the size of each can be deduced from the scale bar shown in FIG. 3A.

HATCN-Based STM Processing

The STM image of FIG. 4A was recorded from a monolayer of hexaazartriphenylene-hexacarbonitrile (HATCN) molecules on silver (111) at 300 K under ultra high vacuum (UHV) conditions and with a platinum-iridium tip. The molecules appear under these conditions as bright entities on a dark and essentially featureless background. The unit cell of the array in the raw data is nearly hexagonal (i.e., two lattice vectors of approximately 2.0±0.1 nm that span an angle of approximately 120°) and comprises two molecules. The monolayer of HATCN molecules is interacting strongly with the underlying silver substrate and there is possibly also a strong lateral interaction between the molecules. Otherwise, Note in passing that Table 1 uses two different full international symbols for plane groups pm and pg in order to signify the orientation of the mirror or glide line. While plane group p1m1 has the mirror line oriented perpendicular to the x-direction, the mirror line is oriented perpendicular to the y-direction in plane group p11m. (The notation p1m1 is the full international (Hermann-Mauguin) symbol (with pm as its short form) and represent the standard setting in this plane group.)

By visual comparison of FIGS. 4B and 4E to the raw STM data of FIG. 4A, it seems plausible that a combination of two-fold, three-fold, and six-fold rotation points may exist in the analyzed 2D array of HATCN molecules, but all of these symmetry elements are obscured by the imperfections of the STM imaging process. Also, from a comparison of FIGS. 4A and 4F, it seems plausible that there are no mirrors or glide lines in the STM imaged array of HATCN molecules.

Figure 5A:
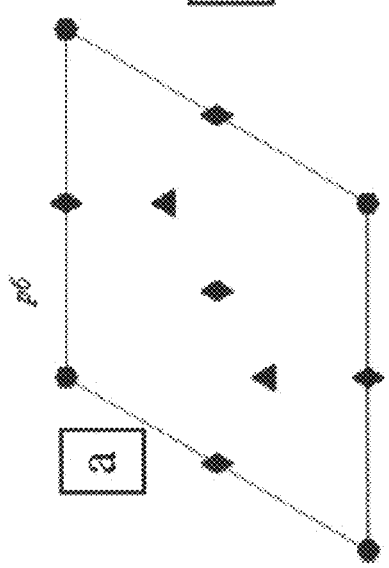
FIG. 5A-5C illustrate the distribution of symmetry elements in plane group p6, point group 3*m* superimposed on the molecule, and plane group p3, respectively.

The presumed combination of two-three- and six-fold rotation points is unique to plane group p6, of which a sketch of the spatial distribution of symmetry elements is shown in FIG. 5A. Note that this plane group also possesses a low combination of amplitude and phase angle residuals as shown in Table 1 at the rather high multiplicity of 6. The deviation of the raw data from this plane group is therefore comparatively small.

Figure 5B:
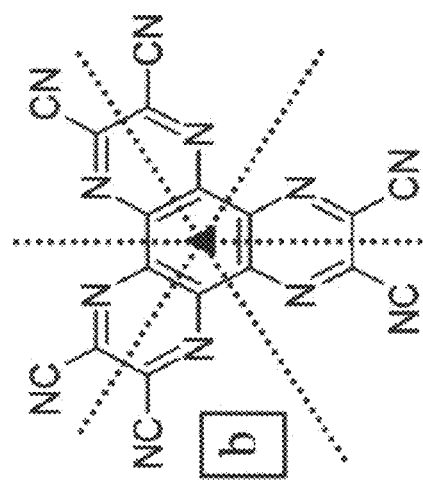

An isolated HATCN molecule possesses point symmetry 3m. A sketch of such a molecule is reproduced as FIG. 5B. When part of a 2D array monolayer and subject to strong interactions to the underlying silver substrate as well as to lateral interactions with closely spaced neighboring molecules, this point symmetry may be broken. (Indeed, simulations showed that the HATCN molecules should be distorted, i.e. bent on the silver surface.)

The relative high amplitude and phase angle residuals of plane groups p1m1, p11m, p3m1, p31m, and p6mm (that all require mirror lines) in Table 1 suggest that it is indeed the mirror lines that are broken in the individual molecules when they are part of the analyzed monolayer array. All of the hexagonal plane groups that contain mirror lines also contain glide lines. The respective groups that contain both kinds of symmetry lines, (i.e. p3m1, p31m and p6mm), may, thus, be ruled out as plane symmetries of a regular 2D array of HATCN molecules on silver. Correspondingly, FIG. 4F, which depicts the highest possible symmetry in 2D enforced on the raw STM data, seems to require too much rearrangement of the intensity in the raw STM image to be considered a plausible representation of the underlying symmetry of a densely packed array of HATCN molecules on silver.

Figure 5C:
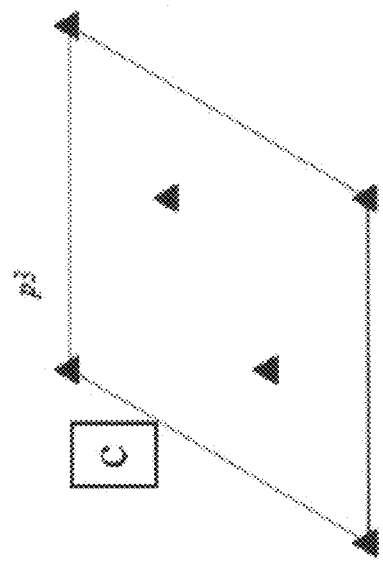

Plane groups p3 (FIG. 5C) and p6 (FIG. 5A) both possess three-fold rotation points at positions (⅓,⅔) and (⅔,⅓). In the latter group, these two positions are symmetry equivalent as they can be exchanged for each other by the action of the two-fold rotation point at position (½,½). In plane group p3, on the other hand, there is no such two-fold point (FIG. 5C).

Indeed, a visual comparison between FIGS. 4D and 4E shows that the raw data are symmetrized in both cases so that the molecules acquire site symmetry 3, but only in plane group p6 are both molecules with necessity identical. This is more clearly shown in the contour maps of FIGS. 6A-6B.

It is quite remarkable that the translation averaged version of the raw STM data (FIG. 6C) shows a distribution of contour lines that possess a "mildly broken" three-fold point at position (0,0), i.e. the center of the dark spot. A "more heavily broken" two-fold point seems to exist in FIG. 6C at position (½,½). This is consistent with the entries of the respective columns of Table 1.

Enforcing both of these symmetries simultaneously leads to plane group p6 with two HATCN molecules at the symmetry equivalent positions (⅓,⅔) and (⅔,⅓). From all of the above, we conclude that the plane symmetry group of the real 2D array of HATCN molecules on silver (111) is probably p6 as a result of the breaking of the mirror symmetries of the 2D point symmetry of isolated molecules. The plane group of silver (111) is actually p6mm, but its surface may be reconstructed to a lower symmetry and the lateral interaction between the HATCN molecules in close contact may contribute to this inferred symmetry breaking.

Blunt Tip Corrections Based on Fluorinated Cobalt Phthalocyanine on Graphite

Figures 7A, 7B, 7C, 7D, 7E:
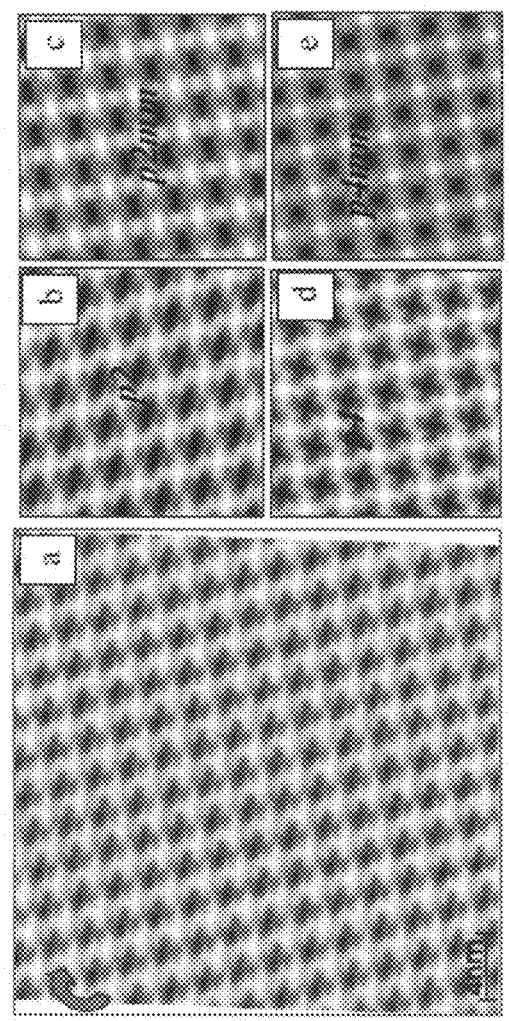
FIGS. 7A-7E are STM images of regular 2D arrays of $F_{16}CoPc$ molecules on highly ordered pyrolytic graphite (technically known as HOPG).

The STM image of FIG. 7A was recorded from a regular 2D array of fluorinated cobalt phthalocyanine ($F_{16}CoPc$) molecules on highly (001) oriented pyrolytic graphite (known as HOPG) at 20 K under ultra high vacuum (UHV) conditions and with a tungsten tip that was held at room temperature. This image is sufficiently large and visually quite homogenous so that it is suitable to show that the Fourier coefficient amplitude and phase angle residuals (and with them the prevailing point spread function) do not change significantly from one image area to another.

Five arbitrarily chosen areas of this STM image were processed by CIP using the crystallographic image processing (CIP) software CRISP. The amplitude and phase angle residuals are for plane group p4mm and some of its subgroups rather similar for all of these selected areas as shown in Table 2. Visually quite homogenous appearing SPM images are more or less translation invariant and the point spread function of one part of the image could be used to correct another part of the image.

TABLE 2

Fourier coefficient amplitude and phase angle residuals for plane group p4mm and some of its subgroups for five arbitrarily chosen areas of the same experimental STM image of a 2D periodic array of $F_{16}CoPc$ molecules on HOPG of FIG. 7A. The diameter of the circular sections was 1024 pixels encircling approximately 45 periodic motifs. Since the image size is only 1771 by 1771, the areas were partially overlapping. The low residuals for both p1m1 and p11m suggest that two perpendicular mirror lines are probably compatible (as subgroups of p2mm (FIG. 7C), and p4mm (FIG. 7E)) with the raw STM image of FIG. 7A.

| | p2 | p1m1 | p11m | p2mm | p4 | p4mm |
|---|---|---|---|---|---|---|
| 1st section | | | | | | |
| $A_{res}$ in % | | 15.8 | 15.8 | 15.8 | 27.8 | 29.2 |
| $\phi_{res}$ in ° | 19.7 | 18.1 | 18.3 | 25.7 | 21.8 | 31.7 |
| 2nd section | | | | | | |
| $A_{res}$ in % | | 15.2 | 15.2 | 15.2 | 27.0 | 28.1 |
| $\phi_{res}$ in ° | 19.2 | 17.5 | 18.7 | 25.7 | 19.9 | 30.0 |
| 3rd section | | | | | | |
| $A_{res}$ in % | | 14.6 | 14.6 | 14.6 | 25.9 | 27.4 |
| $\phi_{res}$ in ° | 18.7 | 17.7 | 18.5 | 25.7 | 20.4 | 29.7 |
| 4th section | | | | | | |
| $A_{res}$ in % | | 15.7 | 15.7 | 15.7 | 27.5 | 29.4 |
| $\phi_{res}$ in ° | 19.4 | 16.6 | 18.4 | 25.5 | 20.0 | 30.1 |
| 5th section | | | | | | |
| $A_{res}$ in % | | 15.0 | 15.0 | 15.0 | 27.4 | 28.7 |
| $\phi_{res}$ in ° | 19.2 | 18.0 | 18.4 | 25.7 | 20.4 | 30.1 |

Figures 8A, 8B, 8C:
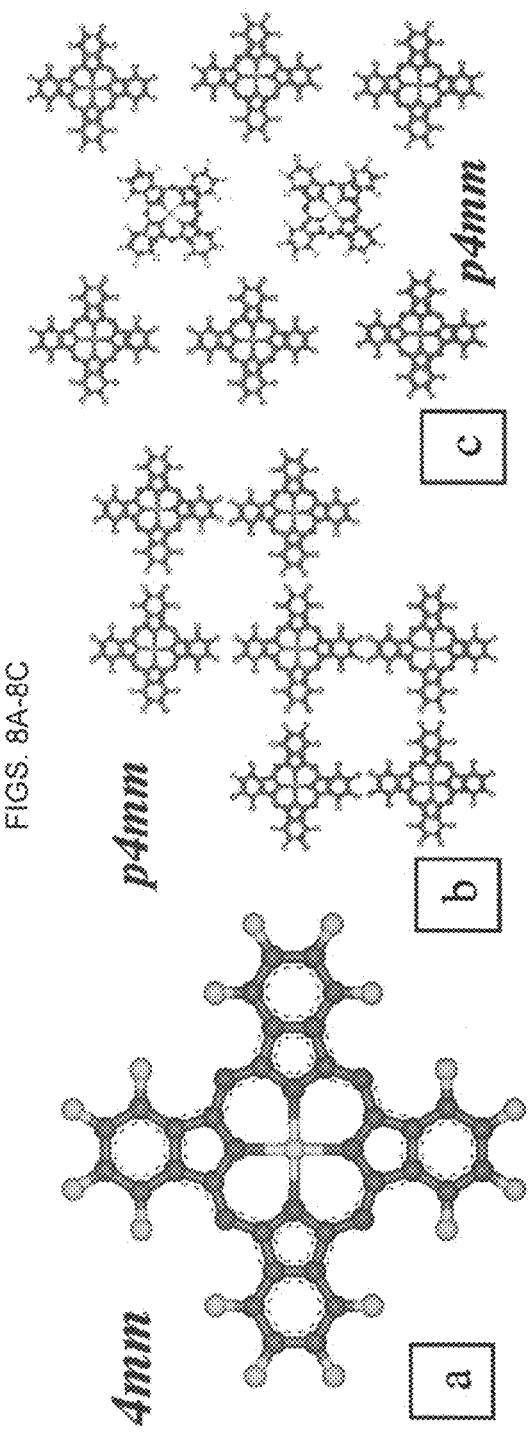

When the periodic motif in FIG. 7A is compared to a sketch of an isolated $F_{16}CoPc$ molecule shown in FIG. 8A, no resemblance to the latter is found for any particular orientation of the molecule with respect to the basis vectors of the lattice. The (isolated) molecule itself possesses the 2D point symmetry 4mm, so the highest symmetric plane group that is possible for such a molecule (when it remains undistorted as part of a 2D periodic array) is p4mm, where the positions (0,0) and (½,½) possess this site symmetry and the 2D lattice is a square. The lattice of the raw STM image (FIG. 7A) on the other hand, is oblique.

A p4mm arrangement of $F_{16}CoPc$ molecules where just the (0,0) site is occupied is shown in FIG. 8B. FIG. 8C, on the other hand, shows a p4mm arrangement of two $F_{16}CoPc$ molecules with both 4mm sites occupied. The lattice remains primitive, i.e. there is no centering as indicated by the leading p in the plane group symmetry symbol, but two molecules need to "pair up" to form a new periodic motif that fills the whole plane by translations in the latter case. For both theoretically possible 2D periodic arrangements of undistorted $F_{16}CoPc$ molecules (FIGS. 8B-8C), no resemblance to the periodic motif in the raw STM data (FIG. 7A) can be discerned. Accordingly, it appears that this raw image was recorded with a blunt tip that can consist either of protruding orbitals from many individual W atoms or from whole $F_{16}CoPc$ molecules that are attached to the tip, or perhaps a combination of both of these possibilities. The periodic motif in this figure is, thus, probably more representative of the blunt scanning probe tip than of the genuine sample surface features, which are probably (undisturbed) individual $F_{16}$CoPc molecules that are arranged in a more or less regular monolayer 2D periodic array. (It is also well known from simulations that multiple mini-tips tend to obscure vacancies in SPM images of 2D periodic surface features. No vacancies are visible for the periodic motif in the raw STM image, so this image may not possess molecular resolution.)

Two or more acting mini-tips of a blunt STM tip will tend to produce linear superpositions of two or more independent STM images. In some cases, there may be noticeable interference effects between mini-tips that may obscure periodicities. Associated STM images that exhibit only 1D periodicity clearly although the sample is 2D periodic may show "interference bands" and can be discarded. In other cases, interference effects between mini-tips may be negligible and not obscure periodicities. These STM images can be successfully CIP processed, CIP enhanced, and the prevalent point spread function of the microscope determined since the interference effects then correspond to negligible systematic errors. Similar considerations also apply to images that were recorded with other types of SPMs.

While FIG. 7E shows the fully symmetrized STM image, only subgroups of the plane symmetry group p4mm have been enforced in FIGS. 7B to 7D. Of these four symmetry enforced versions of the raw STM data, the p4mm version offers clearly the most detailed representation of the atomistic details of the (undisturbed) $F_{16}$CoPc molecules. The high level of atomistic detail in this image is due to the enhanced signal to noise ratio that can be achieved with multiple mini-tip recording and subsequent symmetry enforcing of the most probable plane group by CIP. FIG. 7E also shows that the single molecule motif arrangement of FIG. 8B is realized for (undisturbed) $F_{16}$CoPc molecules that form a regular 2D monolayer array on HOPG.

For comparison, the enforcing of plane symmetry group p4 results only in an alignment of four-fold rotation points of the molecules in the independent STM images which are due to the multiple mini-tips (besides the creation of a square 2D lattice) (FIG. 7D). On the other hand, the enforcing of plane symmetry group p4 or any of the other subgroups of p4mm allows for distortions to the point symmetry of isolated $F_{16}$CoPc molecules that may result from them becoming part of a regular 2D periodic array.

Positions (0,0) and (½,½) both possess site symmetry 4 in plane group p4, but it is clear from FIGS. 7D and 7A that only the first of these two positions is occupied. There is, however, no restriction on the azimuthal orientation of the independent images in this plane group, so that an incomplete alignment of the (undisturbed) molecules may result with a corresponding loss in atomic detail. Enforcing plane symmetry group p2 (FIG. 7B) is somewhat similar in this respect, with the differences that of the two positions with site symmetry 2, motifs are only placed at (0,0) with no restriction on the azimuthal orientation of the independent images, and that the resulting lattice is oblique.

The enforcing of plane symmetry group p2mm, on the other hand, results in some restrictions of the azimuthal orientation of the independent images (just as enforcing plane group p4mm does), but there are four positions with site symmetry 2mm, i.e. (0,0), (½,0), (0,½), and (½,½), the lattice is only rectangular (rather than square as for p4mm) and the multiplicity is only 4 (rather than 8 as for p4mm). This means probably that not all of the independent images of (undistorted) molecules are superimposed properly either. It appears that more independent images are aligned to position (0,0) with the correct azimuth, resulting in a comparatively higher intensity there than at position (½,0). Azimuthally, the alignment of the independent images is likely to remain in plane group p2mm somewhat imperfect (when compared to the alignment in plane group p4mm) because positions (0,0) and (½,0) are characterized by the intersection of two perpendicular mirror lines, whereas the (undistorted) $F_{16}$CoPc molecule possesses two sets of such intersecting mirror lines rotated by 45° with respect to each other. The positions (½,½) and (0,½) seem to remain unoccupied by motifs in FIG. 7C. This is consistent with plane group p4mm (FIG. 7E) where the position (0,½) also possesses site symmetry 2mm and also seems to be not occupied by a single molecule motif. Position (½,½) of the fully symmetrized STM image of FIG. 7E seems to remain unoccupied. This is consistent with the sketch of the periodic arrangement in FIG. 8B and FIG. 2. If this were not so, the periodic motif would consist of paired up $F_{16}$CoPc molecules (rather than of a single molecule). Going back to the raw STM image of FIG. 7A, a paired up molecule motif would appear as an "apparent centering" of the unit cell, which is clearly not the case. (Such centering would be "apparent" because a square lattice cannot be centered.)

It must be noted here that the plane symmetry of the true natural arrangement of the $F_{16}$CoPc molecules on HOPG is not proven to be p4mm by the CIP procedures. If the molecules are undistorted in the 2D array, their 2D point group (4mm) requires plane group p4mm for the mutual arrangement. If the molecules are distorted into one of the subgroups of point group 4mm (e.g. 4, 2mm, m, or 2), their arrangement in the array can only possess the symmetry of the respective subgroup of plane symmetry group p4mm.

Blunt SPM Tip Symmetrization by Crystallographic Image Processing, a Simulation

Figure 9:
FIG. 9 includes simulations of blunt tip deconvolution based on Crystallographic Image Processing.

FIG. 9 illustrates simulations of a blunt SPM tip deconvolution based on CIP. The left hand column of FIG. 9 shows an image of a regular "pseudo-square array" of three identical crosses. While a 512 by 512 pixel square has been selected for CIP in the top image, a 512 pixel diameter circle has been selected for the same purpose for the bottom image. The crosses possess point symmetry 4mm. The direct space unit cell contains three of these crosses that form together one periodic motif in a primitive lattice that is quasi-oblique. This means that the asymmetric unit possesses no rotation points to which the origin could be fixed.

CIP determined the Fourier coefficient amplitude and phase angle residuals for each of the non-hexagonal higher-symmetric plane groups. The position in the real space unit cell about which the respective symmetry is the least broken was also determined for each of these plane groups. Because of the high multiplicity of p4mm, the CRISP program selected this plane group as the most likely plane symmetry despite its comparatively high Fourier coefficient amplitude (31.9% top, 32.9% bottom) and phase angle (42.4° top, 43.8° bottom) residuals. Enforcing p4mm for the position about which this symmetry is the least broken leads to the symmetrized images in the middle column for the top and bottom rows. The column to the right shows for comparison the translation averaged images, i.e. the same data in plane group p1. Thus, the symmetry enforcing step of the CIP procedure can be viewed as equivalent to shifting intensity to the right positions, i.e. to the crystallographic origin and its translation equivalent positions while making sure that the intensity distribution around each of these positions possesses the required site symmetry. For plane group p4mm, the site symmetry at the origin (and its translation equivalent positions) is 4mm. Since this is also the point symmetry of each of the crosses, one can say that one of the crosses remained at the same position while the other two crosses were brought into coincidence with it. In the case of three identical entities with the site symmetry of the origin and for a primitive lattice, there should be a marginal improvement of the signal to noise ratio by This improvement in the signal to noise ratio is in the middle column offset by computational artifacts of the CIP procedure as implemented in the particular commercial software that was used. The main artifact arises from the need to select a finite patch of an otherwise infinitely large image of a 2D periodic array.

As shown in FIG. 9, the left hand column images can also be viewed as superpositions of three independent images of the same square array. These images can, thus, be understood as corresponding to a blunt SPM tip consisting of three mini-tips, and thus FIG. 9 demonstrates that CIP can effectively symmetrize a blunt SPM tip.

Reduction of Geometrical Distortions and Noise in SPM Images

As illustrated above, the estimate of the point spread function as obtained by CIP on a 2D periodic and highly symmetric calibration sample can be used to assess the overall performance and correctness of the calibration of an SPM. In an ideal SPM, the point spread function would be a 2D Dirac delta function and its convolution with the sample surface feature function would be inconsequential. A real SPM should be able to perform closely to its ideal counterpart as a result of CIP on an image from a 2D (or 1D) periodic and highly symmetric calibration sample (and additional tip dilation if necessary, especially if the microscope is an AFM).

In the above description of CIP, noise in the raw SPM image was largely ignored. This description is based on the procedures that are used in electron crystallography for the recovery of crystallographic structure factors under the weak phase approximation from high resolution phase contrast images of inorganics. Such images have an inherently good signal to noise ratio, so that the ignoring of noise is justified. The same is true for STM images of 2D periodic sample surfaces that are recorded at low temperatures in high vacuum. When good models for the prevalent noise are available, one can use suitably constructed Wiener filters in conjunction with CIP for the optimal removal of noise and geometric distortions from SPM images.

As already discussed above, the crystallographic averaging over all (N·M) asymmetric units in SPM images and the plane symmetry enforcing suppress noise simply because it is not periodic. Only noise that incidentally possesses the same 2D spatial frequencies as the periodic sample surface features is not filtered out by a Fourier back-transform of the symmetrized Fourier coefficients of the image intensity. This noise is, however, also averaged and symmetrized by the CIP procedures so that its effects are the smaller the higher the symmetric 2D (or 1D) periodic sample surface features are and the more unit cells over which the averaging occurs.

Figures 10A, 10B:
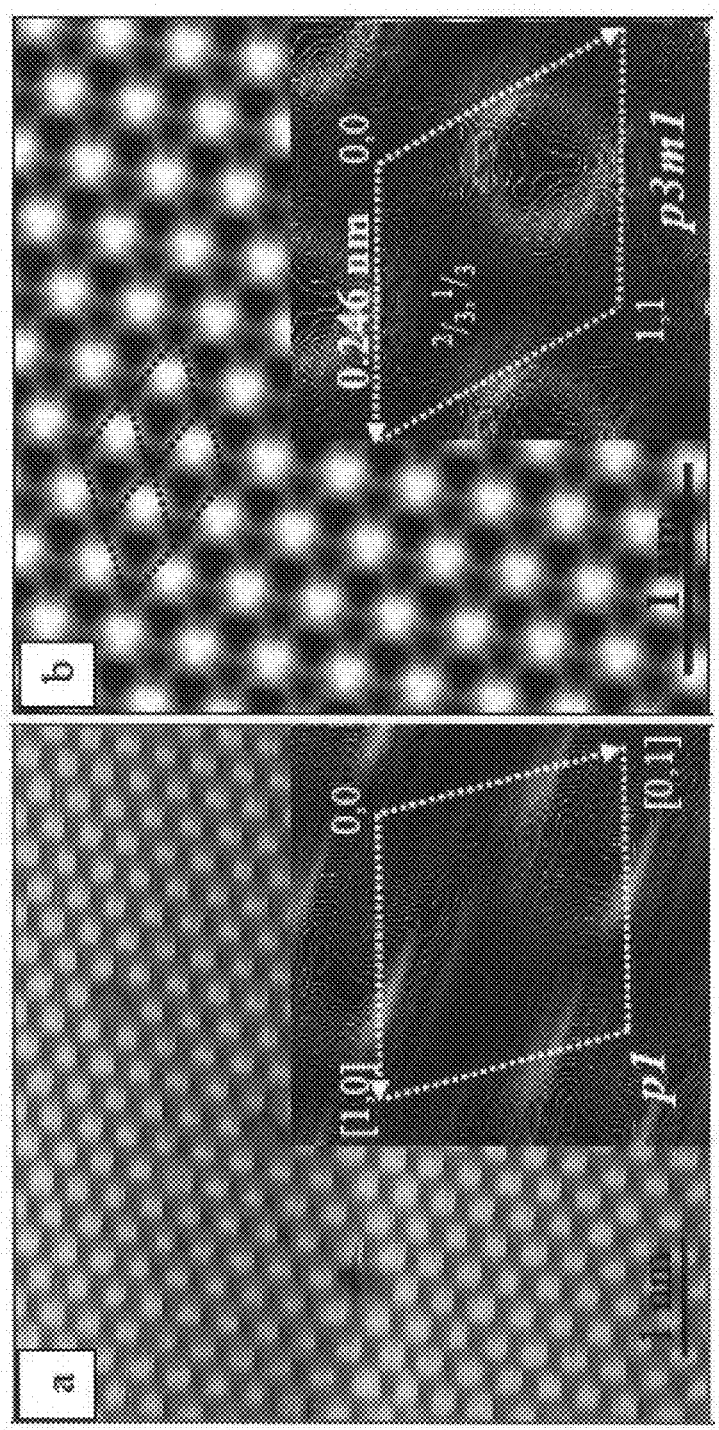
FIGS. 10A-10B are STM images of an array of $F_{16}CoPc$ molecules on HOPG that show a contrast that is dominated by the density of electronic states of graphite.

Crystallographic Processing of STM Images of an Array of $F_{16}CoPc$ Molecules on HOPG that are Dominated by the Local Density of States at the Fermi Level of Graphite The STM image of FIG. 10A was recorded under ultra high vacuum conditions at 30 K from a hexagonal array of $F_{16}CoPc$ molecules on HOPG with a tungsten tip (under specific imaging conditions). The plane symmetry of the local density of states at the Fermi level of graphite, i.e. plane group p3m1, dominates the contrast.

Utilizing the CIP software CRISP, the Fourier coefficient amplitude and phase angle residuals can be determined for a selection of possible plane groups of the STM image as given in Table 3. The amplitude and phase angle residuals of Table 3 for plane group p6mm and a selections of its subgroups are associated with a central circular section of the STM image of HOPG (FIG. 10A) based on 47 observed (and 6 CIP created) reflections. The diameter of the circular section was 512 pixels, encircling approximately 150 (clearly visible) molecules and five associated vacancies (of which two are obscured by the inset). The relative high amplitude residuals for all groups are due to both image bow in the raw data and an oblique (116.3°) unit cell with a unit cell vector length difference of 1.44% in the translation averaged data. Plane group p3m1 possesses indeed a reasonably low phase angle residual given the fact that the general position in this plane group possesses a multiplicity of 6, i.e. twice the multiplicity of plane group p3 and equal to the multiplicity of p31m and p6. The phase angle residuals for plane groups p31m, p6, and p6mm are significantly higher than that for plane group p3m1.

TABLE 3

Fourier coefficient amplitude and phase residuals for the STM image of FIG. 10A.

| | p2 | p3 | p3m1 | p31m | p6 | p6mm |
|---|---|---|---|---|---|---|
| $A_{res}$ in % | | 50.3 | 51.4 | 51.4 | 50.3 | 51.4 |
| $\phi_{res}$ in ° | 19.5 | 13.6 | 16.6 | 27.7 | 29.9 | 30.1 |

Plane group p3m1 was, therefore, enforced on the raw STM image of FIG. 10A and the result is show as FIG. 10B. The intensity distribution over 1.5 unit cells is shown as contour maps in the two insets of this figure. The 3m. site symmetry at positions (0,0), (⅓,⅔), (⅔,⅓) and (1,0), as well as (0,1) and (1,1), in the inset of FIG. 10B results directly from enforcing the p3m1 symmetry on the raw STM image of FIG. 10A. Such a plane group enforcement simply ensures that 3m, the highest point symmetry that is compatible with this plane group, occurs at all positions that need to possess it in order to belong to plane group p3m1.

While the inset of FIG. 10A shows the averaged oblique translation lattice that results from translation averaging (p1 enforcing) on the raw STM image, its counterpart inset in FIG. 10B shows the hexagonal translation symmetry enforced lattice. Note also the shift of both the intensity contours and the origin (0,0) between the two insets. While the origin in the p1 contour map was selected implicitly by applying a circular mask on the raw image, the origin in the p3m1 map was found and enforced by the CIP origin refinement procedure. (Note that applying a circular mask on a raw image is typically an arbitrary procedure that results in an arbitrary choice of the origin. In plane group p1, there is no prescribed location of the origin because the identity element is the only site symmetry for all points in the unit cell. In plane group the p3m1, on the other hand, the origin must per definition be located on one of the three-fold points).

There are vacancies in the raw STM image of FIG. 10A, so this experimental image shows genuine molecular/atomic resolution. In the symmetry enforced version of this image, FIG. 10B, the vacancies are averaged out. The total intensity of this symmetrized image is, therefore, reduced by about 3%, i.e. 5 vacancies per about 150 bright features, with respect to the total intensity in another symmetrized image (of the same size) from the same sample for which there were no vacancies in the raw data. Note also by comparison with FIG. 10B that the image bow in the raw STM image has been removed as a byproduct of the CIP plane symmetry enforcing procedure. (There is no total image intensity reduction associated with the correction of image bow.)

Employing Pierre Curie's symmetry principle and the reciprocity principle of SPM imaging, enforcing plane symmetry p3m1 on the raw STM image of FIG. 10A results in a summarization of the scanning probe tip into point group 3m. This is in agreement with the general statement that the point symmetry of the symmetrized scanning probe tip will always be that of the highest allowed site symmetry of the plane group that has been CIP enforced on an SPM image.

Table 4 lists the 24 strongest Fourier coefficients of the STM images of FIG. 10A and of the inverse of the prevailing point spread function. Only Fourier coefficients with amplitudes that are at least 0.15% of the maximal observed amplitude are shown. The asterisk after selected observed phase angles indicates that the respective phase angle differs by more than 45° from the symmetrized phase angle for this Fourier coefficient in column six. Note that all of these phase angles are for Fourier coefficients with amplitudes that are less than 10% of the amplitude of the strongest Fourier coefficient. Double lines in the rows of the table separate between groups of symmetry equivalent Fourier coefficients. Note that the last column, $\phi_{sym}-\phi_{obs}$, is constrained to the bracket $-180°<\phi_{invPSF}<=180°$ as this is typically preferred in the electron crystallography community. While the third and fourth columns of this table refer to FIG. 10A, the fifth and sixth columns refer to FIG. 10B. The Fourier coefficients of the inverse of the prevailing point spread function are listed in the final two columns of this table. Justifying the application of the CIP procedures to this STM image, one can conclude that the distortions in FIG. 10A are not "very severe" from the relative low amplitudes of the Fourier coefficients of the inverse of the prevailing point spread function.

TABLE 4

Selected Fourier coefficients of the STM images of FIGS. 10A-10B and of the inverse of the prevailing point spread function.

| H | K | $A_{obs}$ | $\phi_{obs}$ [°] | $A_{sym}$ | $\phi_{sym}$ [°] | $A_{sym}/A_{obs}$ | $\phi_{sym}-\phi_{obs}$ [°] |
|---|---|-----|------|------|------|------|-----|
| 0 | 1 | 10000 | −10 | 7565 | −10 | 0.76 | 0 |
| 1 | 0 | 9198 | 10 | 7565 | 10 | 0.82 | 0 |
| 1 | −1 | 3497 | −9 | 7565 | −10 | 2.16 | −1 |
| 0 | 2 | 1550 | 38 | 850 | 57 | 0.55 | 19 |
| 2 | 0 | 690 | −148* | 850 | −57 | 1.23 | 91 |
| 2 | −2 | 309 | −83* | 850 | 57 | 2.75 | 140 |
| 1 | 1 | 2072 | −167 | 1132 | 180 | 0.55 | −13 |
| 1 | −2 | 788 | −14* | 1132 | 180 | 1.44 | −166 |
| 2 | −1 | 537 | −71* | 1132 | 180 | 2.11 | −109 |
| 1 | 2 | 1374 | 87 | 561 | 106 | 0.41 | 19 |
| 1 | −3 | 138 | 118* | 561 | −106 | 4.07 | 136 |
| 2 | 1 | 1147 | −116 | 561 | −106 | 0.49 | 10 |
| 2 | −3 | 92 | 47* | 561 | 106 | 6.10 | 59 |
| 3 | −1 | 409 | 173* | 561 | −106 | 1.37 | 81 |
| 3 | −2 | 207 | 46* | 561 | 106 | 2.71 | 60 |
| 1 | 3 | 906 | −175 | 237 | −155 | 0.26 | 20 |
| 1 | −4 | 137 | 27* | 237 | 155 | 1.73 | 128 |
| 3 | 1 | 258 | 122 | 237 | 155 | 0.92 | 33 |
| 3 | −4 | 43 | −84* | 237 | −155 | 5.51 | −71 |
| 4 | −1 | 61 | 130 | 237 | 155 | 3.89 | 25 |
| 4 | −3 | 15 | 156* | 237 | −155 | 15.8 | 49 |
| 2 | 2 | 592 | 176 | 238 | 180 | 0.40 | 4 |
| 2 | −4 | 86 | 23* | 238 | 180 | 2.77 | 157 |
| 4 | −2 | 36 | −56* | 238 | 180 | 6.61 | −124 |

Figures 11A, 11B:
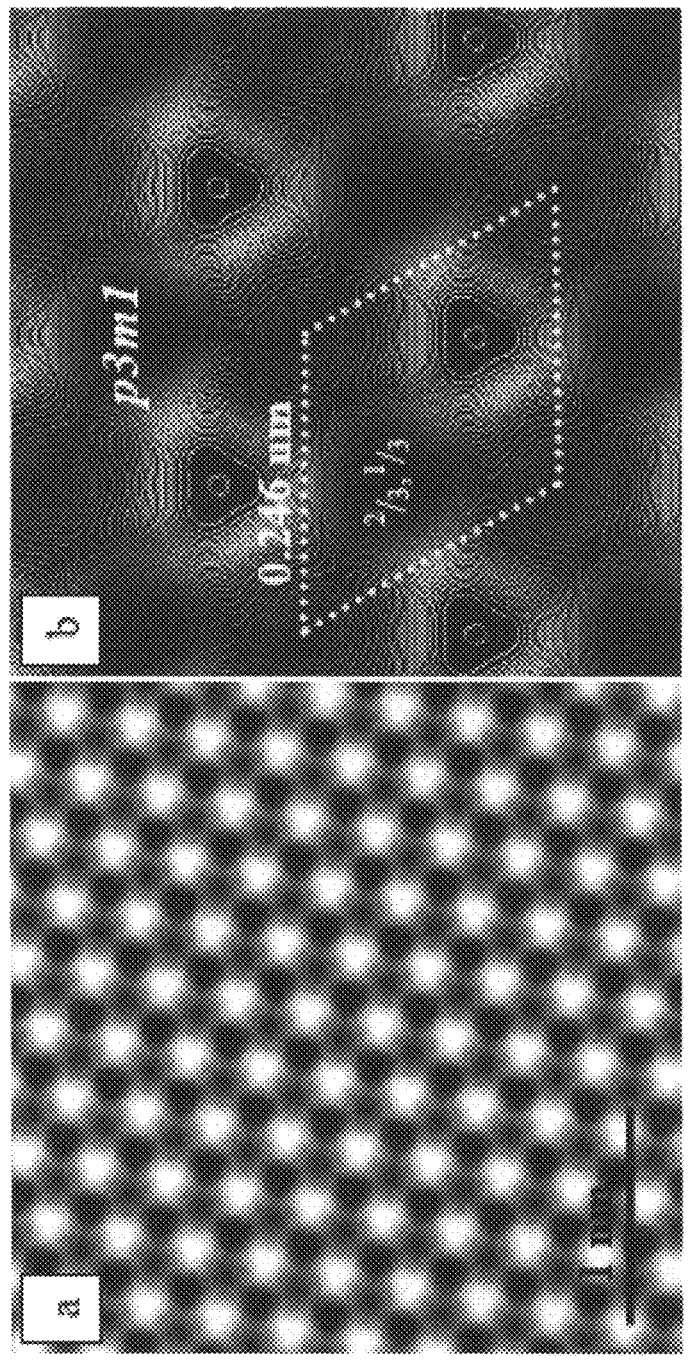
FIGS. 11A-11B illustrate high amplitude Fourier coefficient approximations to the p3$m$1 enforced version of the experimentally obtained STM image of $F_{16}CoPc$ on HOPG of FIG. 10A. The 24 (strongest) Fourier coefficients (H,K) of Table 4, of which 6 are unique, were used for the Fourier synthesis that produced this image.

A Fourier series has, therefore, been calculated for the product of the 24 strongest Fourier coefficients of the raw STM image (FIG. 10A) with the Fourier coefficients of the prevalent inverse point spread function as given in Table 4. The result is shown in FIG. 11A which looks remarkably similar to FIG. 10B. Note also that the contour map of FIG. 11B is also very similar to the contour map inset in FIG. 10B.

Without a detailed and thorough analysis of the actual imaging process with the particular STM that has been utilized, it is impossible to assert with certainty that FIG. 10B is superior to FIG. 11A (or vice versa) in giving a faithful representation of the ideal 2D periodic local density of electronic states of this sample under the prevailing imaging conditions.

Some of the detail in FIG. 10B and its contour map inset may be spurious, i.e., represent the effects of small systematic errors. Vice versa, some genuine information on the sample may be missing in FIG. 11A because the respective Fourier coefficients were discarded, i.e., filtered out, before this image was calculated. In the absence of detailed and thorough analyses, one may for simplicity use somewhat arbitrarily "judicious choices" on how far out in reciprocal space there might still be meaningful information. This is especially a problem for highest resolution STM images that were recorded at room temperature where there might be a few hundreds of Fourier coefficients of the image intensity to deal with. What one must make sure in each case is that the judicious choices do not invalidate the conclusions of the respective study. For example, results that are based on all observable Fourier coefficients can be compared with results that are restricted by the judicious choices in some qualitative (e.g., visual comparison of FIGS. 10B with 11A) and semi-quantitative (e.g., numerical comparison of the entries of Tables 5 and 6) manner.

Table 5 gives a selection of Fourier coefficient amplitude and phase angle residuals for the p3m1 plane symmetry enforced STM image of FIG. 11A. These residuals were calculated with the software CRISP. Now that the image has been symmetrized to plane symmetry group p3m1 on the basis of the 24 strongest Fourier coefficients, the amplitude and phase angle residuals are very low for p3m1 and its subgroup p3. There can be no two- or six-fold points as the high phase angle residuals for p2 and p6 show, respectively. Note that the Fourier coefficient amplitude and phase angle residuals for plane group p3m1 are not zero in this table. This is partly due to accumulated calculation errors and the utilization of a discrete Fourier transform over a limited number of pixels rather than a continuous Fourier transform over infinitely many mathematical points and crystallographic motifs. The same applies of course to the respective residuals of Table 6 as well.

TABLE 5

Fourier coefficient amplitude and phase angle residuals for plane group p6mm and some of its subgroups on the basis of the STM image of FIG. 11A (that was itself Fourier synthesized on the basis of the 24 strongest Fourier coefficients of FIG. 10A.)

|  | p2 | p3 | p3m1 | p31m | p6 | p6mm |
|---|---|---|---|---|---|---|
| $A_{res}$ in % |  | 1.4 | 1.4 | 1.4 | 1.4 | 1.4 |
| $\phi_{res}$ in ° | 20.1 | 2.3 | 2.4 | 21.2 | 21.2 | 21.2 |

Calculating the Fourier coefficient amplitude and phase angle residuals on the basis of all of the 53 Fourier coefficients to FIG. 10B with the same program results in the values given in Table 6. Since FIGS. 11A and 10B are very similar, the residuals in both tables are also very similar.

TABLE 6

Fourier coefficient amplitude and phase angle residuals for plane group p6mm and some of its subgroups on the basis of all 53 Fourier coefficients of FIG. 10B.

|  | p2 | p3 | p3m1 | p31m | p6 | p6mm |
|---|---|---|---|---|---|---|
| $A_{res}$ in % |  | 1.8 | 1.8 | 1.8 | 1.8 | 1.8 |
| $\phi_{res}$ in ° | 21.3 | 1.2 | 1.3 | 21.3 | 21.4 | 21.4 |

It is well known from image-based electron crystallography that including higher spatial frequency reflections (H,K) that tend to have lower amplitudes in a Fourier synthesis results in slightly more image detail, while the outline of a structure is well described by the higher amplitude Fourier coefficients that tend to have lower spatial frequencies. This can also be gleaned from comparisons of the respective images in FIGS. 10B and 11A, and Tables 5 and 6.

Inverse Point Spread Function from STM Image of FIG. 10A

Figure 12B:
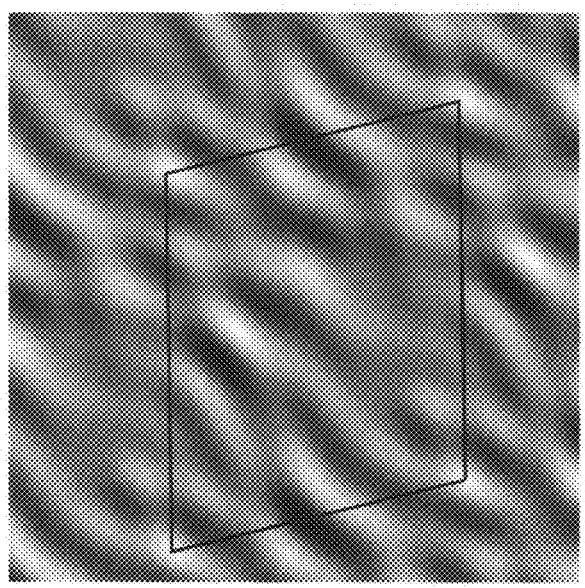
FIGS. 12A-12B illustrate an inverse point spread function for the experimental conditions that were prevalent when the experimental STM image of FIG. 10A was recorded.
Figure 12A:
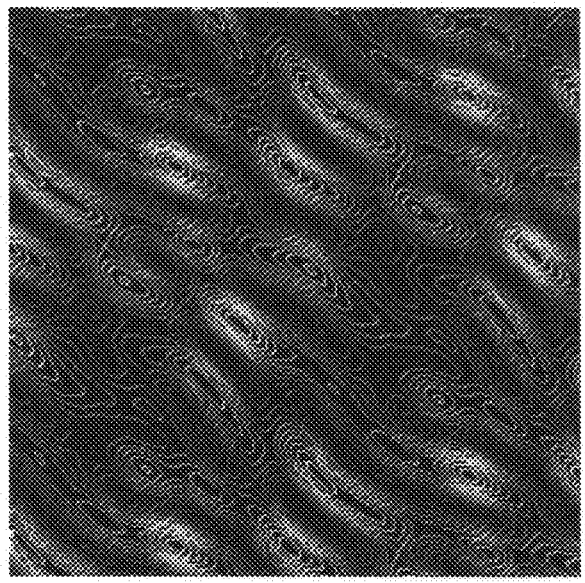

As discussed above, the last two columns of Table 5 represent 24 "more important" Fourier coefficients of the inverse point spread function for the prevailing experimental conditions under which the STM image of FIG. 10A was recorded. A Fourier synthesis of these 24 coefficients combined with the remaining 29 "less important" Fourier coefficients of the image of FIG. 10B (for the same experimental conditions) gives the inverse point spread function for the prevalent experimental conditions in direct space as shown in FIGS. 12A-12B. As one would expect, the 2D symmetry of this function is plane group p1 so that the unit cell is oblique and does not contain site symmetries other than the identity element 1 (FIG. 12B). Interestingly, there are several maxima in this function within one unit cell. This corresponds to a so called "blunt scanning probe tip" that itself consist of several mini-tips. Note that the inverse point spread function of FIGS. 12A-12B is time averaged and not all mini-tips that are displayed in FIGS. 12A-12B may have acted simultaneously during the recording of the STM image of FIG. 10A.

Figures 13A, 13B:
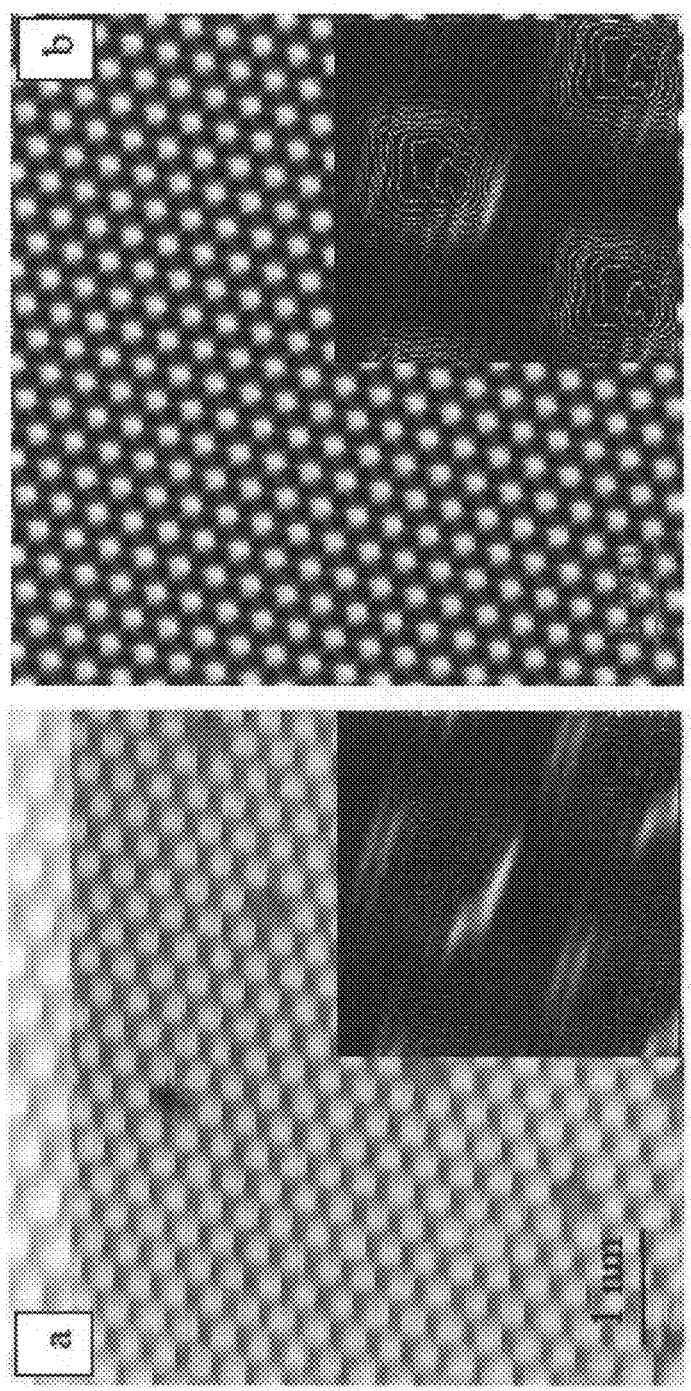
FIGS. 13A-13B are STM images of a second area of the same array of $F_{16}CoPc$ molecules on HOPG (that was recorded under essentially the same imaging conditions as FIG. 11A and show a contrast that is dominated by the density of electronic states of graphite).

This inverse point spread function was utilized in order to correct the STM image from another area of the same sample, shown in FIG. 13A. The STM image of the second area of the same sample was recorded under essentially the same experimental conditions so that this procedure is justified. As this image was recorded at the same magnification, it possesses (more or less) the same 2D real space periodicity. After selecting a circular area with a diameter of 512 pixels, the image of FIG. 13A was Fourier transformed and the Fourier coefficients of the image intensity multiplied with the respective coefficients of the Fourier transform of the prevalent inverse point spread function. From the resulting set of modified Fourier coefficients, a Fourier series was calculated and is shown as FIG. 13B. The contour map of 1.5 unit cells of this corrected STM image is shown in the inset.

Comparing FIG. 13A (raw STM data) with FIG. 13B (corrected STM data) allows for a visual appreciation of the effectiveness of the procedure. The contour map of the corrected image, inset in FIG. 13B may be compared directly with the contour maps of a p3m1 symmetrized STM image of a different area of the same sample, i.e. inset in FIG. 10B and FIG. 11B.

While the p3m1 symmetrized versions of STM data reflect (for obvious reasons) the ideal 2D symmetry very well, the STM data that were corrected with the inverse point spread function from another area sample of the same sample do not strictly adhere to this symmetry. In the contour map inset of FIG. 13B, one can, however, make out the succession of one high peak by two distinct "troughs" (corresponding to positions (⅔,⅓) and (1,0) in the inset of FIG. 10B) along the long diagonal of the unit cell, while there is only one "trough" in the contour map insets of the raw STM data of both FIGS. 13A and 10A.

Table 7 lists the Fourier coefficient amplitude and phase angle residuals of a central circular section of the raw data of the second STM image from a different area of the same sample (FIG. 13A) for plane group p6mm and some of its subgroups. The relative high amplitude residuals for all groups are due to both the "height offset artifact" in the raw data, shown in FIG. 13A and the oblique unit cell of the translation averaged version of this data, (inset of FIG. 13A).

Note that the phase angle residual for "one of the wrong" two plane groups with multiplicity 6 (p31m) is for this raw STM image actually lower that for the correct plane group p3m1 with the same multiplicity.

The Fourier coefficient amplitude and phase angle residuals for plane group p6mm and some of its subgroups for a central circular section of the corrected STM image, FIG. 13B, are listed in Table 8. A comparison of the respective entries in Tables 7 and 8 can be utilized for a numerical appreciation of the effectiveness of the correcting procedure. As one would expect, the correction procedure reduces all of the residuals.

The unit cell of the translation averaged corrected STM data (inset of FIG. 13B), seems to resemble a hexagonal unit cell also a bit more closely. From the respective Fourier coefficient amplitude and phase angle residuals of Table 8, the corrected image is closest to plane group p3m1, i.e. the correct plane group for this STM image.

TABLE 7

Fourier coefficient amplitude and phase angle residuals for plane group p6mm and some of its subgroups for a central circular section of the raw STM image of FIG. 13A, (based on all 51 observed coefficients). The diameter of the circular section was 512 pixels, encircling approximately 150 periodic motifs and six associated vacancies. For comparison with other images, the translation averaged version of the raw STM data (inset of FIG. 13A) possesses lattice vectors that differ by 5.62% in length and intersect at an angle of 118.8°

| | p2 | p3 | p3m1 | p31m | p6 | p6mm |
|---|---|---|---|---|---|---|
| $A_{res}$ in % | | 53.7 | 55.2 | 55.2 | 53.7 | 55.2 |
| $\phi_{res}$ in ° | 16.4 | 11.4 | 15.8 | 14.7 | 20.6 | 20.6 |

TABLE 8

Fourier coefficient amplitude and phase angle residuals for plane group p6mm and some of its subgroups for a central circular section of the corrected STM image of FIG. 13B (based on all observed 51 coefficients). The diameter of the circular section was 512 pixels, encircling approximately 150 periodic motifs. (For comparison with other images, the translation averaged version of the corrected STM data (inset of FIG. 13B) possesses lattice vectors that differ by 4.86% in length and intersect at an angle of 118.2°.)

| | p2 | p3 | p3m1 | p31m | p6 | p6mm |
|---|---|---|---|---|---|---|
| $A_{res}$ in % | | 13.0 | 14.4 | 14.4 | 13.0 | 14.4 |
| $\phi_{res}$ in ° | 9.6 | 11.2 | 13.3 | 13.7 | 18.2 | 18.4 |

Figures 14A, 14B, 14C, 14D:
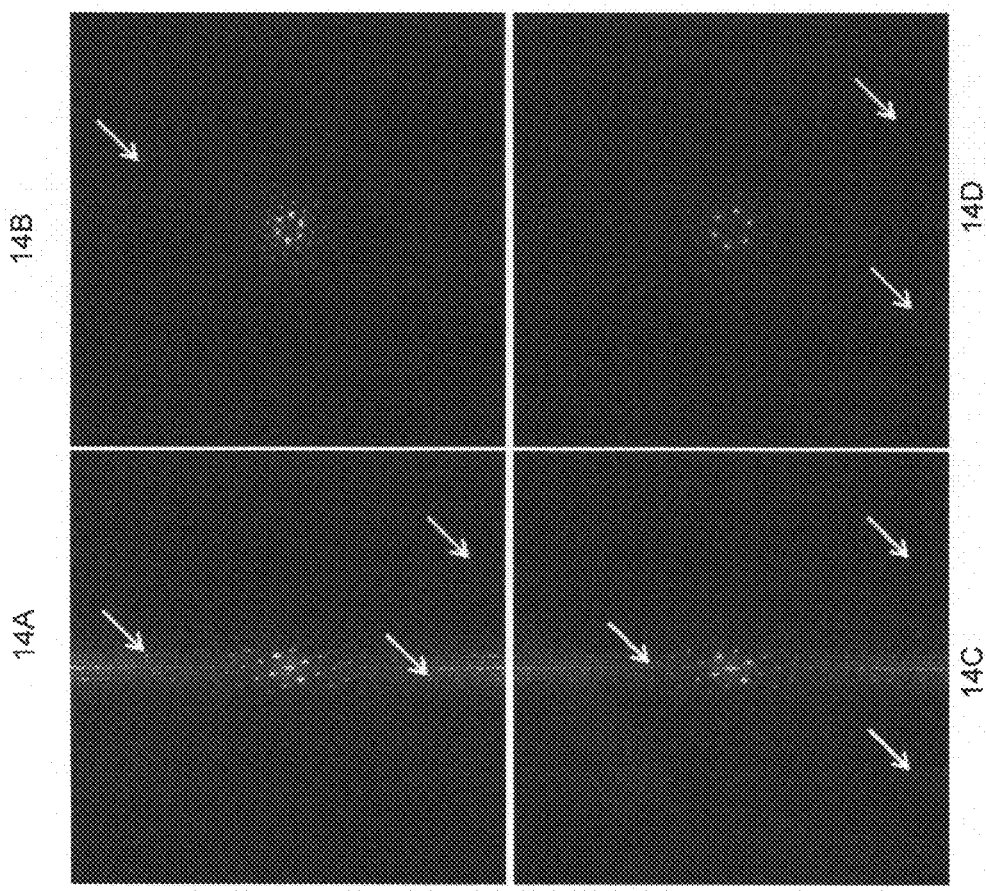
FIGS. 14A-14D represent Fourier transform amplitude plots associated with the images of FIGS. 10A, 10B, 13A, and 13B, respectively. Note the marked improvements in the "regularity of the transforms" for both the symmetrized (FIG. 14B) and corrected (FIG. 14D) versions of the raw data of the two STM images of different areas of the same array of $F_{16}CoPc$ molecules on HOPG (FIG. 14A) and (FIG. 14C) that were recorded under essentially the same experimental conditions.

FIGS. 14A-14B provide a visual comparison of the Fourier transform amplitudes of the raw (FIG. 10A) and p3m1 symmetrized (FIG. 10B) versions of the STM data from the first sample area, respectively. FIGS. 14C-14D, on the other hand, provide a visual comparison of the Fourier transform amplitudes of the raw STM data (FIG. 13A) and the corrected STM data (FIG. 13B) from the second sample area, respectively. We mark in all Fourier transforms a few spots or regions of intensity that we consider as referring to either spurious real space image details or noise. Note the marked improvements in the "regularity" of the Fourier transform amplitudes of both the symmetrized (FIG. 14B) and the corrected (FIG. 14D) STM data for which the respective raw STM data were recorded subsequently from two different areas of the same sample with the same microscope under essentially the same experimental conditions.

Cobalt(II) Phthalocyanine Monolayer on Gold

Figure 15A:
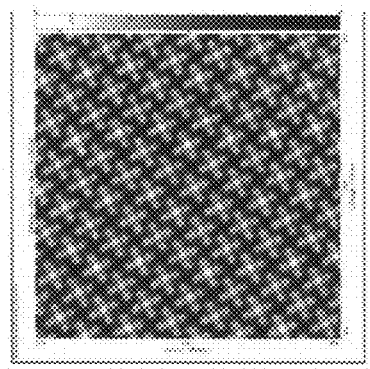
FIGS. 15A-15C are STM images of a monolayer of cobalt (II) phthalocyanine molecules on gold.
Figure 15B:
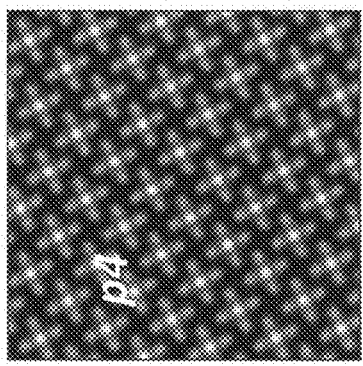
Figure 15C:
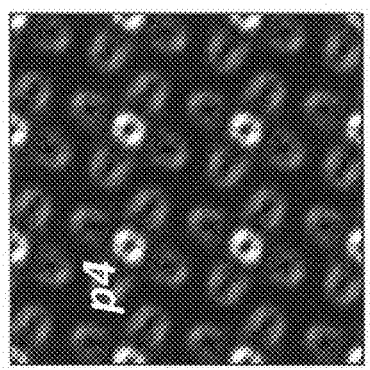
Figure 15D:
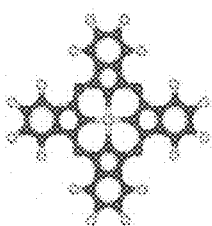

FIGS. 15A-15C are STM images of a monolayer of cobalt (II) phthalocyanine molecules on gold. FIG. 15A is raw data, FIG. 15B is p4 enforced data, and FIG. 15C is a contour map of the p4 enforced data. A sketch of the structure of this molecule is shown in both FIG. 15D and FIG. 8A. Such a sample may be used as a S™/CIP calibration sample.

Regular Arrays of Ga Droplets by Ga+ sputtering of GaAs Surfaces

Figures 16A, 16B, 16C:
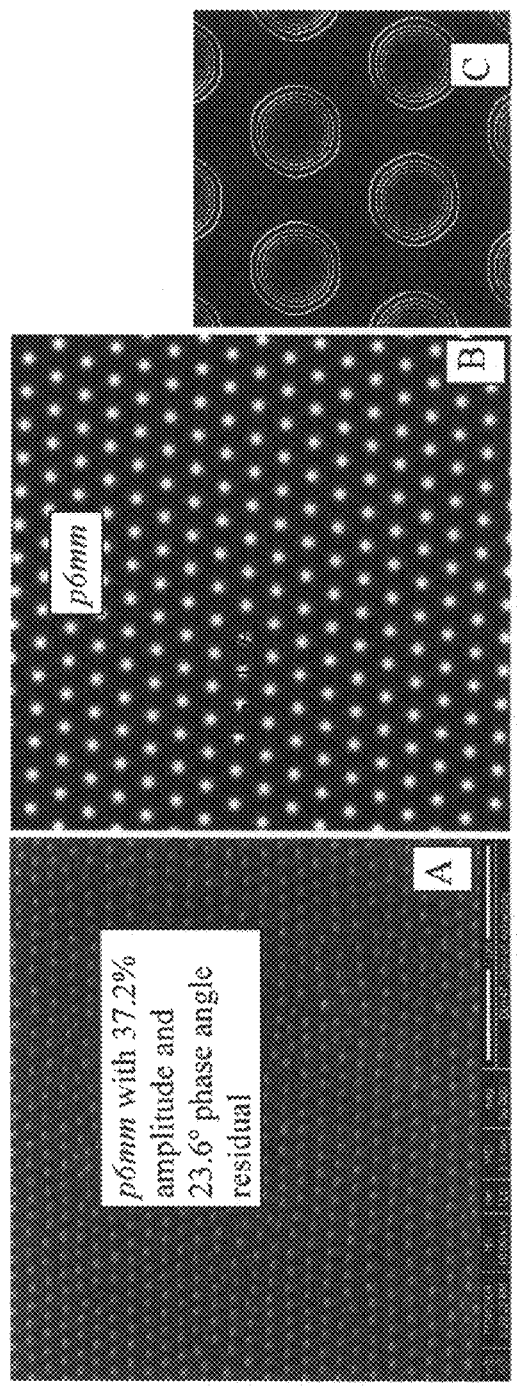
Figure 17A:
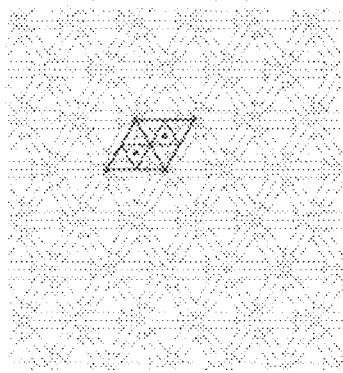
Figure 17B:
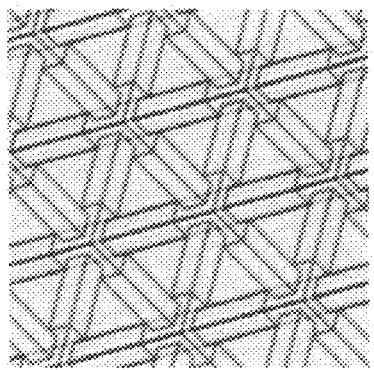
FIG. 17B is a cross-correlation with a translation averaged, plane group p1 symmetrized, version of this image.

FIGS. 16A-16C are scanning electron microscopy (SEM) images of highly ordered Ga nano-droplets on a GaAs surface produced by a focused ion beam. Such droplets can be formed with a "dual beam" focused ion beam/e-beam wherein beam alignment with respect to the sample is selected to provide ordering in the Ga droplets on a GaAs surface. Arsenic is preferentially sputtered off the GaAs surface, and additional Ga is provided by the focused ion beam. FIG. 16A is raw SEM data, FIG. 16B is p6$mm$ enforced data, and FIG. 16C is an inverse contour map of the p6$mm$ enforced data. The average size of the nano-droplets and their average shape at the base to the substrate as well as their inter-droplet distance can straightforwardly be determined from the p6$mm$ symmetrized version of the raw data. This is because when the nano-droplets are idealized to possess a circular base and are all identical, a densest packing of such entities would possess plane group p6$mm$. The Fourier coefficient amplitude and phase angle residuals of FIG. 16A for this plane group, are therefore direct measures for the homogeneity of the array. By systematic exploration of the growth parameter space and the assessment of the grown arrays by CIP, it becomes possible to grow arrays that are even more regular than indicated in FIG. 16A by the respective Fourier coefficient amplitude and phase angle residuals. It is anticipated that the more regular arrays will also possess better electrical properties in nanoelectronics devices that are constructed on this basis.

SPM Images of Regular Arrays of Monodisperse Polystyrene Latex Particles on a Substrate Very regular and most densely packed 2D arrays of identical 3D entities that self assemble, possess approximately circles in a suitable 2D projection and are securely attached to a substrate can also be used as calibration samples for SPM in connection with the CIP techniques of the present teachings. Such arrays will also possess a mildly broken p6$mm$ plane symmetry and can for example be made straightforwardly from commercially available monodisperse polystyrene latex spheres or other suitable entities. Monodisperse polystyrene latex spheres form readily closest packed 2D arrays (with a plane symmetry that is close to p6$mm$) and can on the basis of self assembly processes attached themselves to by van der Waals or miniscus forces to substrates such as mica. Mica often serves as substrate for the SPM imaging of macromolecular biological molecules that do not form regular arrays by themselves. While the macro-molecular biological molecules to be investigated by SPM could be deposited from a suitable fluid on one area of a substrate, an adjacent area of the substrate with a self assembled 2D array of monodisperse polystyrene latex spheres could serve as "SPM/CIP calibration area". This 2D array with a plane symmetry close to p6$mm$ could be deposited on the same substrate from the same or another suitable fluid. The size of the monodisperse polystyrene latex spheres will then determine the periodicity of the array so that highly symmetric SPM/CIP calibration samples can be made cheaply to specification.

Combining Auto- and Cross-Correlation Techniques with Crystallographic Image Processing in Order to Decide on the Most Likely Plane Group that an Image Possesses FIGS. 17-20 illustrate the usage of cross- and auto-correlation techniques in combination with crystallographic image processing. The cross correlation of a 2D periodic and symmetric raw image with the translation averaged version of this image is shown in FIGS. 17A-B. Note that plane group p31$m$ provides visually a very good description of the plane symmetry in the raw images of FIGS. 17A, 18A, 19A, and 20A. A sketch of the distribution of the symmetry elements of p31$m$ has, therefore, been added as inset to these figures. For the cross correlation of this raw image with the translation averaged version of this image, or with the p1 CIP enforced template in other words, the cross correlation coefficient at the origin of the unit cell is normalized to unity.

Subsequently, this cross correlation coefficient is used as a "baseline value" for quantitative comparisons with crosscorrelation coefficients at the origin that were derived from other cross-correlations between the same raw image and templates that were CIP enforced to the plane groups that possess a hexagonal lattice as shown in FIGS. 18B-18C and FIGS. 19B-19D.

Figure 18A:
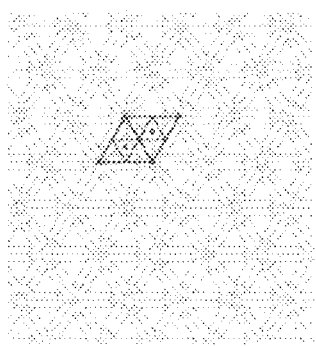
FIGS. 18A-C show an original image (FIG. 18A) and its cross-correlations with versions that have been symmetrized with plane groups that contain six-fold rotation points (p6 and p6$mm$, FIGS. 18B and 18C, respectively) at the crystallographic origin.
Figure 18B:
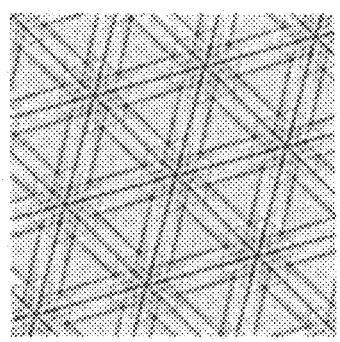
Figure 18C:
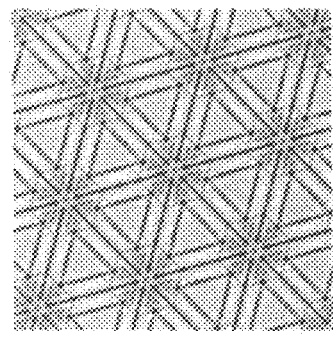

FIGS. 18A-18C shows the results of cross correlations of the same 2D periodic and symmetric raw image with symmetrized versions of the image that contain six fold rotation points at the origin, i.e. cross correlations with p6 and p6$mm$ enforced templates are show in other words. FIGS. 19A-19D shows the results of cross correlations of the same 2D periodic and symmetric raw image with symmetrized versions of the image that contain three-fold rotation points at the origin. In other words, p3, p3$m$1 and p31$m$ enforced templates have been used for these cross-correlations. The normalized cross-correlation coefficients for the origin CC(0,0) are 3.6, 3.76, 3.69, 3.78, and 3.93 for the images of FIGS. 18B, 18C, 19B, 19C, and 19D, respectively.

Since the cross-correlation of the raw image with its p31$m$ CIP enforced template, FIG. 19D possesses the highest normalized cross-correlation coefficients, one can conclude that the plane symmetry in the raw image is indeed best described by plane group p31$m$.

FIG. 20 shows the results of the auto-correlation of the same 2D periodic and symmetric raw image with itself. The lattice parameters can be straightforwardly derived from such an auto-correlated image.

Representative Computing Environment

Figure 21:
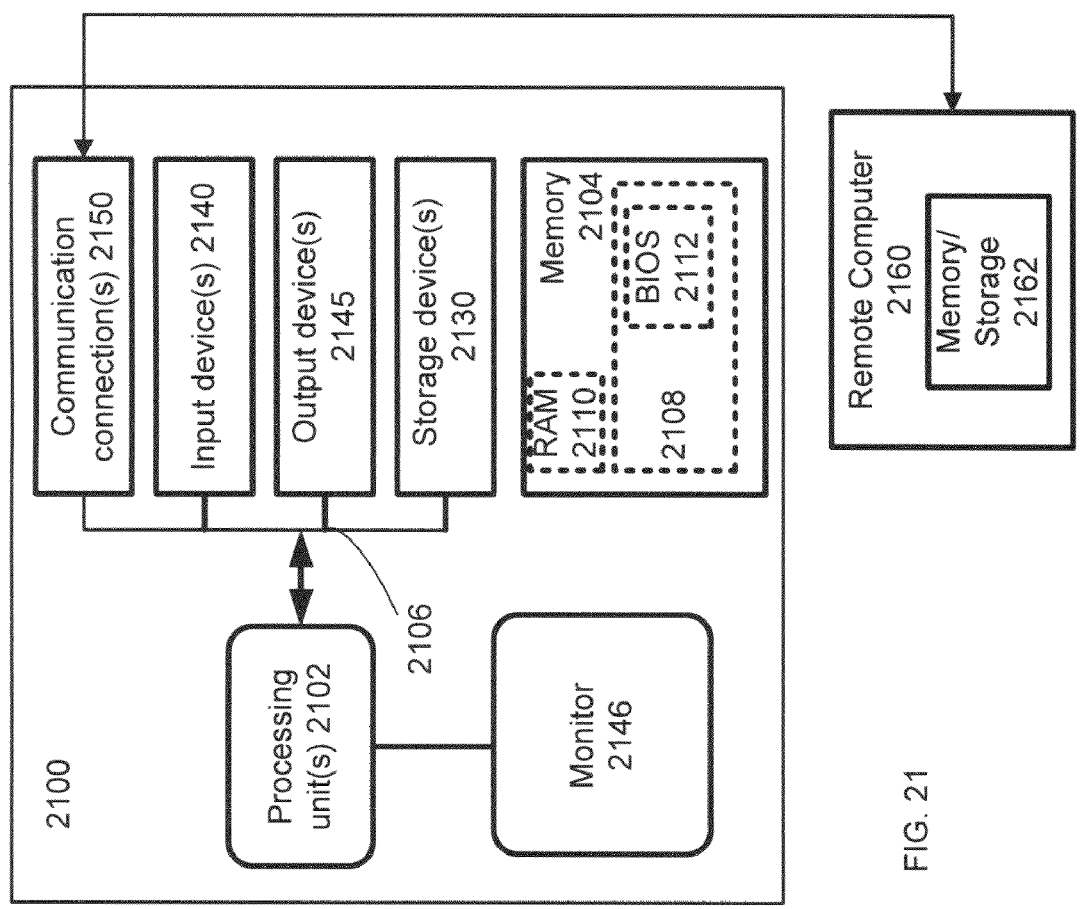
FIG. 21 is a block diagram of a representative computing environment for the disclosed methods.

FIG. 21 and the following discussion are intended to provide a brief, general description of an exemplary computing environment in which the disclosed technology may be implemented. Although not required, the disclosed technology is described in the general context of computer-executable instructions, such as program modules, being executed by a personal computer (PC). Generally, program modules include routines, programs, objects, components, data structures, etc., that perform particular tasks or implement particular abstract data types. Moreover, the disclosed technology may be implemented with other computer system configurations, including hand-held devices, multiprocessor systems, microprocessor-based or programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules may be located in both local and remote memory storage devices.

With reference to FIG. 21, an exemplary system for implementing the disclosed technology includes a general purpose computing device in the form of an exemplary conventional PC 2100, including one or more processing units 2102, a system memory 2104, and a system bus 2106 that couples various system components including the system memory 2104 to the one or more processing units 2102. The system bus 2106 may be any of several types of bus structures including a memory bus or memory controller, a peripheral bus, and a local bus using any of a variety of bus architectures. The exemplary system memory 2104 includes read only memory (ROM) 2108 and random access memory (RAM) 2110. A basic input/output system (BIOS) 2112, containing the basic routines that help with the transfer of information between elements within the PC 2100, is stored in ROM 2108.

The exemplary PC 2100 further includes one or more storage devices 2130 such as a hard disk drive for reading from and writing to a hard disk, a magnetic disk drive for reading from or writing to a removable magnetic disk, and an optical disk drive for reading from or writing to a removable optical disk (such as a CD-ROM or other optical media). Such storage devices can be connected to the system bus 2106 by a hard disk drive interface, a magnetic disk drive interface, and an optical drive interface, respectively. The drives and their associated computer-readable media provide nonvolatile storage of computer-readable instructions, data structures, program modules, and other data for the PC 2100. Other types of computer-readable media which can store data that is accessible by a PC, such as magnetic cassettes, flash memory cards, digital video disks, CDs, DVDs, RAMs, ROMs, and the like, may also be used in the exemplary operating environment.

A number of program modules may be stored in the storage devices 2130 including an operating system, one or more application programs, other program modules, and program data. A user may enter commands and information into the PC 2100 through one or more input devices 2140 such as a keyboard and a pointing device such as a mouse. Other input devices may include a digital camera, microphone, joystick, game pad, satellite dish, scanner, or the like. These and other input devices are often connected to the one or more processing units 2102 through a serial port interface that is coupled to the system bus 2106, but may be connected by other interfaces such as a parallel port, game port, or universal serial bus (USB). A monitor 2146 or other type of display device is also connected to the system bus 2106 via an interface, such as a video adapter. Other peripheral output devices, such as speakers and printers (not shown), may be included. Computer executable instructions for estimating SPM point spread functions and enforcing symmetries can be stored on the storage devices 2130 and/or input via the input devices 2140.

The PC 2100 may operate in a networked environment using logical connections to one or more remote computers, such as a remote computer 2160. In some examples, one or more network or communication connections 2150 are included. The remote computer 2160 may be another PC, a server, a router, a network PC, or a peer device or other common network node, and typically includes many or all of the elements described above relative to the PC 2100, although only a memory storage device 2162 has been illustrated in FIG. 21. The personal computer 2100 and/or the remote computer 2160 can be connected to a logical a local area network (LAN) and a wide area network (WAN). Such networking environments are commonplace in offices, enterprise-wide computer networks, intranets, and the Internet.

When used in a LAN networking environment, the PC 2100 is connected to the LAN through a network interface. When used in a WAN networking environment, the PC 2100 typically includes a modem or other means for establishing communications over the WAN, such as the Internet. In a networked environment, program modules depicted relative to the personal computer 2100, or portions thereof, may be stored in the remote memory storage device or other locations on the LAN or WAN. The network connections shown are exemplary, and other means of establishing a communications link between the computers may be used. In examples, such computer systems provide SPM control and data collection, and can be provided with an SPM. In other examples, computer systems are configured to process local or remote data without providing SPM control.

The present systems, and aspects thereof, are described further in the following appendices, and may be combined, optionally, with apparatus, methods, kits, and/or software, or components thereof, described in U.S. Pat. No. 7,472,576. The subject matter of the invention includes all novel and non-obvious combinations and sub-combinations of the various elements, features, functions, and/or properties disclosed herein and/or therein. The description has focused, for clarity, on samples that may be treated as strictly 2D periodic and symmetric. However, the present teachings also may be applied to three-dimensional, or quasi-three-dimensional, samples. For example, critical dimension SPMs may collect information involving a third dimension, positioned above and/or below the sample plane. SPM images recorded with such an instrument may be processed, as described herein, using the 80 diperiodic space groups for quantification and/or enforcement of symmetry, instead of the 17 plane groups applicable purely in two dimensions.

Symmetry is an abstract mathematical concept and has been said to lie in the "eye of the beholder" for real world objects such as 2D images of scanning probe-sample interactions that are recorded with a SPM. Symmetry in 2D images can, however, be reliably quantified and enforced by crystallographic image processing. These quantifications can be used to assess the overall performance and correctness of the calibration of all kinds of SPMs. Enforcing the most probable plane symmetry on a SPM image results in the removal of artifacts that are due to the microscope imaging process. Plane symmetry enforcing on a SPM image may also be considered as being equivalent to scanning probe tip symmetrization close to the symmetry of an ideal needle.

In one example, crystallographic image processing has been demonstrated on a scanning tunneling microscopy image of a regular 2D monolayer array of hexaazartriphenylene-hexacarbonitrile molecules on silver. The conclusion was drawn that the three mirror lines of the 2D point symmetry group of the isolated molecules ($3m$) are probably broken when the molecules become part of the array.

The symmetrization of a blunt scanning tunneling microscopy tip by crystallographic image processing has been demonstrated on a regular array of fluorinated cobalt phthalocyanine molecules on graphite. The molecules in this array are presumably interacting only weakly (with each other and the substrate) so that it could be assumed that there is no breaking of their 2D point symmetry when isolated molecules become part of this epitaxial system. An associated enhancement of the signal to noise ratio of the symmetrized image has been observed.

The point spread function of an SPM can be determined by crystallographic processing of images that are recorded from a 2D (or 1D) periodic and highly symmetric calibration sample. Because corrections for sample tilt and image bow (so called z-offset removal and z-flattening) are being performed quite regularly in SPM on the basis of presumed prior knowledge, one may with even greater confidence enforce quantified plane symmetries on the raw scanning probe microscopy data from 2D periodic surface features in order to remove similarly obvious imperfections of the imaging process from experimental surface science data.

The examples disclosed herein are representative only, and are not to be taken as limiting the scope of the disclosed technology. I claim all that is encompassed by the appended claims.

The invention claimed is:

1. A method, comprising:
   obtaining a scanning probe microscope image associated with a sample exhibiting at least 1D periodicity and symmetry; and
   processing the scanning probe microscope image crystallographically so as to enforce a symmetry group.

2. The method of claim 1, further comprising selecting a symmetry group to be enforced based on at least one Fourier coefficient amplitude or phase angle residual.

3. The method of claim 1, further comprising selecting a symmetry group to be enforced based on the application of at least one geometric Akaike information criterion.

4. The method of claim 1, further comprising selecting a symmetry group to be enforced based on the application of a cross-correlation technique.

5. The method of claim 1, further comprising selecting a symmetry group to be enforced based on a combination of at least one suitable Fourier coefficient amplitude or phase angle residual with the application of a cross-correlation technique and/or at least one geometric Akaike information criterion.

6. The method of claim 1, further comprising displaying the processed image.

7. The method of claim 1, further comprising determining a microscope imaging characteristic based on the processed scanning probe microscope image.

8. The method of claim 7, wherein the microscope imaging characteristic is associated with a microscope point spread function.

9. The method of claim 8, further comprising;
   receiving a second scanning probe microscope image; and
   processing the second scanning probe microscope image based on the microscope imaging characteristic so as to produce a processed second scanning probe microscope image.

10. The method of claim 7, further comprising;
    receiving a second scanning probe microscope image; and
    processing the second scanning probe microscope image based on a microscope point spread function to produce a processed second scanning probe microscope image.

11. The method of claim 1, wherein the sample exhibiting at least 1D periodicity and symmetry is one of an array of hexaazartriphenylene-hexacarbonitrile (HATCN) molecules on (111) silver, an array of fluorinated cobalt phthalocyanine ($F_{16}CoPc$) molecules on (0001) graphite, or an array of cobalt (II) phthalocyanine molecules on gold.

12. The method of claim 1, wherein the sample exhibiting at least 1D periodicity and symmetry is one of an array of densely packed monodisperse polystyrene latex spheres on a substrate.

13. The method of claim 1, further comprising estimating a scanning probe microscope point spread function for a series of progressively larger sample areas, and selecting a particular sample area corresponding to a preferred estimate of the scanning probe microscope point spread function.

14. At least one computer-readable medium comprising computer-executable instructions for performing a method, comprising:
    obtaining a scanning probe microscope image associated with a sample exhibiting at least 1D periodicity and symmetry; and
    processing the scanning probe microscope image crystallographically so as to enforce symmetry group.

15. At least one computer-readable medium comprising computer-executable instructions for performing a method, comprising:
    obtaining a scanning probe microscope image associated with a sample exhibiting at least 1D periodicity and symmetry;
    processing the scanning probe microscope image crystallographically so as to enforce a symmetry group; and
    determining a microscopic imaging characteristic associated with a microscope point spread function based on the processed scanning probe microscope image based on a series of sample areas.

* * * * *